(12) United States Patent
Culbertson, II et al.

(10) Patent No.: US 12,051,903 B1
(45) Date of Patent: Jul. 30, 2024

(54) SYSTEM FOR CONTROLLING POWER IN A FACILITY

(71) Applicant: UIPCO, LLC, San Antonio, TX (US)

(72) Inventors: William Preston Culbertson, II, Plant City, FL (US); Ryan Thomas Russell, The Colony, TX (US); Nathan Lee Post, Rockport, TX (US); Bryan J. Osterkamp, New Braunfels, TX (US); Courtney St. Martin, Duluth, GA (US); Ashley Raine Philbrick, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 290 days.

(21) Appl. No.: 17/682,977

(22) Filed: Feb. 28, 2022

Related U.S. Application Data

(62) Division of application No. 16/943,060, filed on Jul. 30, 2020, now Pat. No. 11,296,510.

(60) Provisional application No. 62/880,799, filed on Jul. 31, 2019.

(51) Int. Cl.
*H02J 3/28* (2006.01)
*H02J 3/14* (2006.01)
*H02J 7/00* (2006.01)
*H02J 9/08* (2006.01)

(52) U.S. Cl.
CPC ............... *H02J 3/28* (2013.01); *H02J 3/14* (2013.01); *H02J 7/0068* (2013.01); *H02J 9/08* (2013.01); *H02J 2310/12* (2020.01); *H02J 2310/52* (2020.01)

(58) Field of Classification Search
CPC ............................. H02J 9/08; H02J 2310/12
USPC ............................................................. 700/295
See application file for complete search history.

(56) References Cited

U.S. PATENT DOCUMENTS

| | | | |
|---|---|---|---|
| 4,195,231 A | 3/1980 | Reed et al. | |
| 5,929,538 A | 7/1999 | O'Sullivan et al. | |
| 9,172,249 B2 | 10/2015 | Rockenfeller et al. | |
| 9,559,607 B1 | 1/2017 | Wang et al. | |

(Continued)

OTHER PUBLICATIONS

Non-Final Office Action mailed Nov. 8, 2022 for U.S. Appl. No. 17/454,351.

(Continued)

*Primary Examiner* — Daniel Cavallari
(74) *Attorney, Agent, or Firm* — Plumsea Law Group, LLC

(57) ABSTRACT

A system for controlling power in a facility having an electrical system including an energy storage device and a generator and an associated fuel tank. The fuel tank provides fuel to the generator and has a gauge indicating remaining fuel. Both the energy storage device and the generator operate. The generator may be used to provide power to the facility, the energy storage device, or both simultaneously. A first power consuming device imposes a first load connected to the electrical system and second power consuming device imposes a second load connected to the electrical system. The system receives information related to the loads and calculates an initial estimated run time of the energy storage device, and information related to the first load and information related to the second load. The system selectively removes the second load in a simulation and calculates a second run time of the energy storage device.

20 Claims, 31 Drawing Sheets

(56) References Cited

U.S. PATENT DOCUMENTS

| | | |
|---|---|---|
| 10,879,727 B1 | 12/2020 | Cooper |
| 2004/0158360 A1 | 8/2004 | Garland, II et al. |
| 2005/0278075 A1* | 12/2005 | Rasmussen ............... H02J 9/06 700/286 |
| 2006/0072262 A1 | 4/2006 | Paik et al. |
| 2010/0094490 A1 | 4/2010 | Alston |
| 2012/0029711 A1 | 2/2012 | Besore |
| 2013/0158893 A1 | 6/2013 | Witter et al. |
| 2015/0171662 A1 | 6/2015 | Lathrop et al. |
| 2015/0324696 A1 | 11/2015 | Hirschbold |
| 2016/0136747 A1 | 5/2016 | Trinkner |
| 2016/0236790 A1 | 8/2016 | Knapp et al. |
| 2016/0261115 A1 | 9/2016 | Asati et al. |
| 2020/0119553 A1* | 4/2020 | Prochniak ........... G06F 3/04847 |

OTHER PUBLICATIONS

Non-Final Office Action mailed Jun. 17, 2021 for U.S. Appl. No. 16/943,060.
Notice of Allowance mailed Dec. 2, 2021 for U.S. Appl. No. 16/943,060.
Office Action mailed Apr. 26, 2021 in U.S. Appl. No. 16/693,511.
Notice of Allowance mailed Oct. 5, 2021 for U.S. Appl. No. 16/693,511.

* cited by examiner

SYSTEM FOR CONTROLLING POWER IN A FACILITY

CROSS-REFERENCE TO RELATED APPLICATIONS

This application is a division of and claims priority to U.S. application Ser. No. 16/943,060, filed Jul. 30, 2020, titled "System for Controlling Power in a Facility," which application claims the benefit of Provisional Patent Application No. 62/880,799, filed Jul. 31, 2019, and titled "System for Controlling Power In A Facility," the disclosures of which applications are incorporated by reference herein in their entirety.

TECHNICAL FIELD

The present disclosure generally relates to a system for controlling power in a facility having an electrical system. In particular, the disclosure relates to an electrical system having an energy storage device and a generator electrically connected to the electrical system of a facility.

BACKGROUND

Electrical power in many countries is available to buildings, lights such as street lights and traffic signals, signage, and other users through wired connections to an electrical supply grid. This form of electrical distribution typically is very reliable and typically provides electrical power on a continuous basis.

However, this grid is subject to failures that interrupt flow of electricity to customers. For example, a line to a user may be cut, whether purposefully or accidentally. An above-ground wire support may be knocked down or damaged, for example during a hurricane, and an attached wire severed. A below-ground cable may be cut or separated from the grid by a natural cause, such as an earthquake, deterioration due to age, and the like. A buried cable also may be cut by imprudent excavation and other subterranean activity.

Whereas such interruptions in electrical power may be an inconvenience for a typical homeowner, these interruptions are completely unacceptable in selected industries and businesses. For example, first responder bases require unfailing power to run lights in surgery and treatment areas. Hospitals also require a continuous electrical supply to ensure health and well-being of patients by keeping lights on, such as in a surgical suite or data center containing an Electronic Medical Records System (lab results, X-rays, medication orders, and the like). Another example of an industry or business that is sensitive to power outages is enterprise data centers for financial and stock transactions. Such centers require unfailing power, as a significant change may occur at any time. Other users of electrical power may be attached to an unreliable grid or a grid distributing power for fewer than 24 hours per day, or no grid may be available.

Users for whom continuous power supply is critical often have an energy storage device and a generator intended to supply power when power may not be available from the electrical grid. The energy storage device may store energy for delivery to a facility and stops supplying energy when the energy in the storage device has been delivered to the facility. The generator requires a supply of fuel, which typically is maintained on site in tanks or suitable containers connected to the generator. With such a generator, the generator stops running when the fuel is exhausted.

There is a need in the art for a new solution that addresses these shortcomings.

SUMMARY

The disclosure is directed to a system for controlling power in a facility having an electrical system that includes a generator. The system also includes an energy storage device. The system may be operated in at least 3 modes: only the generator operates; only the energy storage device operates; and both the generator and the energy storage device operate serially or concurrently.

Only the Generator Operates

In one aspect, the disclosure is directed to a system for controlling power in a facility having an electrical system. The electrical system includes a generator and an associated fuel tank. The fuel tank provides fuel to the generator and has a gauge that indicates the remaining quantity of fuel. The generator is electrically connected to the electrical system of the facility. In this aspect, the system does not have an energy storage device, or the energy storage device is not operable.

A first power consuming device imposes a first load connected to the electrical system of the facility. A second power consuming device imposes a second load connected to the electrical system of the facility. The system receives information related to the first load and to the second load.

The system calculates an initial estimated run time of the generator given the remaining quantity of fuel and information related to the first load and information related to the second load. The system selectively removes the second load in a simulation and calculates a second run time of the generator given the remaining quantity of fuel and information related to the first load while omitting information related to the second load.

In another embodiment, the disclosure is directed to a system for controlling power in a facility having an electrical system. The system includes a generator and an associated fuel tank providing fuel to the generator. The fuel tank has a gauge to indicate the remaining quantity of fuel.

The generator is electrically connected to the electrical system of the facility. The facility includes a plurality of load groups including a first load group connected to the electrical system of the facility, a second load group connected to the electrical system of the facility, and a third load group connected to the electrical system of the facility. The system receives information related to the first load group, information related to the second load group, and information related to the third load group. The system selectively delivers power to one or more load groups. The load groups receiving power are defined as powered load groups. The system calculates an initial estimated run time of the generator, given the remaining quantity of fuel and information related to the powered load groups.

Still another embodiment is directed to a system for controlling power in a facility having an electrical system, a generator and an associated fuel tank providing fuel to the generator. The fuel tank has a gauge to indicate a remaining quantity of fuel.

The generator is electrically connected to the electrical system of the facility, and loads are connected to the electrical system of the facility. The system accurately determines an actual generator run time by determining an initial fuel level and allowing the generator to power the plurality of loads connected to the electrical system for a predetermined period. After the predetermined period, a second fuel level is determined. An actual fuel consumption per unit time is calculated, and an actual generator run time based on the actual fuel consumptions per unit time is determined.

Only the Energy Storage Device Operates

In another aspect, only the energy storage device operates. In such embodiments, the energy storage device will function in a manner analogous to the way the generator operates. Thus, the system, having received information related to the first load and the second load, calculates an initial estimated run time of the energy storage device given the remaining quantity of stored energy and information related to the first load and information related to the second load. The system selectively removes the second load in a simulation and calculates a second run time of the generator given the remaining quantity of fuel and information related to the first load while omitting information related to the second load.

In another embodiment, the disclosure is directed to a system for controlling power in a facility having an electrical system. The system includes an energy storage device having a gauge to indicate the remaining quantity of stored energy, which may be expressed as remaining battery runtime, or draindown time.

The energy storage device is electrically connected to the electrical system of the facility. The facility includes a plurality of load groups including a first load group connected to the electrical system of the facility, a second load group connected to the electrical system of the facility, and a third load group connected to the electrical system of the facility. The system receives information related to the first load group, information related to the second load group, and information related to the third load group. The system selectively delivers power to one or more load groups. The load groups receiving power are defined as powered load groups. The system calculates an initial estimated run time of the energy storage device, given the remaining quantity of energy stored and information related to the powered load groups.

Still another embodiment is directed to a system for controlling power in a facility having an electrical system and an energy storage device having a gauge to indicate a remaining quantity of stored energy. The energy storage device is electrically connected to the electrical system of the facility, and loads are connected to the electrical system of the facility. The system accurately determines an actual energy storage device run time by determining an initial stored energy level and allowing the energy storage device to power the plurality of loads connected to the electrical system for a predetermined period. After the predetermined period, a second stored energy level is determined. An actual energy consumption per unit time is calculated, and an actual energy storage device run time based on the actual energy consumption per unit time is determined.

Both Energy Storage Device and Generator Operate

In yet another aspect, both the energy storage device and the generator operate. Operation may be serial or concurrent. In some embodiments, the generator may be used to provide power to the facility, to the energy storage device to recharge it, or to both simultaneously.

In an embodiment, a system for controlling power in a facility having an electrical system comprises an energy storage device and an associated gauge to indicate a remaining quantity of energy stored in the device. The energy storage device includes an initial quantity of stored energy, and the energy storage device is connected to the electrical system of the facility.

A plurality of loads is connected to the electrical system of the facility. A generator having an associated fuel tank is electrically connected to the electrical system of the facility. The fuel tank provides fuel to the generator and has a gauge to indicate a remaining quantity of fuel.

The system determines an actual run time of the energy storage device by determining an initial quantity of stored energy and an initial quantity of fuel, and then allowing the energy storage device and the generator to power the plurality of loads connected to the electrical system for a predetermined period of time. After the predetermined period of time, a second quantity of energy remaining and a second quantity of fuel remaining are calculated.

An actual energy consumption per unit time for the energy storage device is calculated, and an actual energy consumption per unit time of the generator is determined. Then, an actual run time of the energy storage device and of the generator are determined, based on the actual energy consumptions per unit time.

In another embodiment, a system for controlling power in a facility having an electrical system comprises an energy storage device having an initial quantity of stored energy and an associated gauge to indicate a remaining quantity of stored energy. The energy storage device and a plurality of loads are connected to the electrical system of the facility.

A generator having an associated fuel tank providing fuel to the generator is electrically connected to the electrical system of the facility. The fuel tank has a gauge to indicate a remaining quantity of fuel.

A sensor detects current and voltage of power from the power grid and the energy storage device supplies power to the facility when the sensor detects that power from the grid has low voltage or current until a first predetermined time interval. The generator starts and runs to prepare to supply power to the facility during this first predetermined time interval. After a second predetermined time interval, the energy storage device is shut down.

In still another embodiment, a system for controlling power in a facility having an electrical system comprises an energy storage device and an associated gauge to indicate a remaining quantity of stored energy. The energy storage device is connected to the electrical system of the facility. A first load related to a first power consuming device is connected to the electrical system of the facility. The system receives information related to the first load. A second load is connected to the electrical system of the facility and the system receives information related to the second load.

The system calculates an initial estimated run time of the energy storage device given the remaining quantity of energy and information related to the first load and information related to the second load. The system then selectively removes the second load in a simulation in which the system calculates a second run time of the energy storage device given the remaining quantity of energy and information related to the first load while omitting information related to the second load.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The description can be better understood with reference to the following drawings and detailed description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Only the Generator Operates

Figure 1:
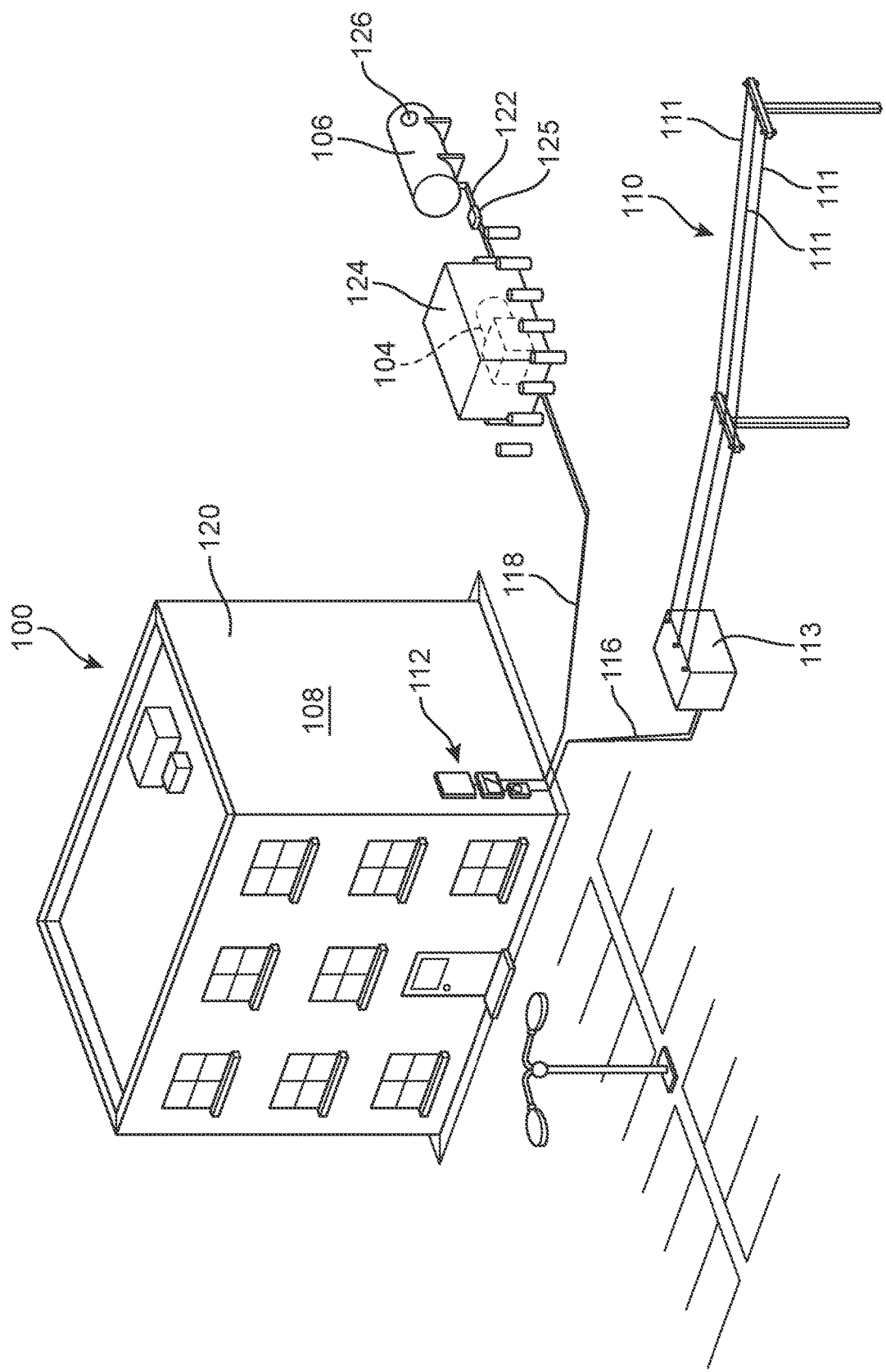
FIG. 1 is a schematic diagram of an embodiment of a facility and associated components of an electrical system.

In one aspect, the disclosure is directed to a system for controlling power in a facility having an electrical system. The electrical system includes a generator and an associated fuel tank. The fuel tank provides fuel to the generator and has a gauge that indicates the remaining quantity of fuel. The generator is electrically connected to the electrical system of the facility.

A first power consuming device imposes a first load connected to the electrical system of the facility. A second power consuming device imposes a second load connected to the electrical system of the facility. The system receives information related to the first load and to the second load.

The system calculates an initial estimated run time of the generator given the remaining quantity of fuel and information related to the first load and information related to the second load. The system selectively removes the second load in a simulation and calculates a second run time of the generator given the remaining quantity of fuel and information related to the first load while omitting information related to the second load.

In another embodiment, the disclosure is directed to a system for controlling power in a facility having an electrical system. The system includes a generator and an associated fuel tank providing fuel to the generator. The fuel tank has a gauge to indicate the remaining quantity of fuel.

The generator is electrically connected to the electrical system of the facility. The facility includes a plurality of load groups including a first load group connected to the electrical system of the facility, a second load group connected to the electrical system of the facility, and a third load group connected to the electrical system of the facility. The system receives information related to the first load group, information related to the second load group, and information related to the third load group. The system selectively delivers power to one or more load groups. The load groups receiving power are defined as powered load groups. The system calculates an initial estimated run time of the generator, given the remaining quantity of fuel and information related to the powered load groups.

Still another embodiment is directed to a system for controlling power in a facility having an electrical system, a generator and an associated fuel tank providing fuel to the generator. The fuel tank has a gauge to indicate a remaining quantity of fuel. The generator is electrically connected to the electrical system of the facility, and loads are connected to the electrical system of the facility. The system accurately determines an actual generator run time by determining an initial fuel level and allowing the generator to power the plurality of loads connected to the electrical system for a predetermined period. After the predetermined period, a second fuel level is determined. An actual fuel consumption per unit time is calculated, and an actual generator run time based on the actual fuel consumptions per unit time is determined.

The disclosure provides a system and method for controlling power to a facility to increase efficiency of decision-making in situations where power is lost. Such power loss may cause an emergency in a facility, and may be termed an emergency power loss. Power may be lost due to accidental damage to the power grid, which also may be known as utility power. Public emergency situations, including natural disasters such as hurricanes or wild fires, may cause power loss by damaging the power grid.

Generally, precautions for power loss can include a generator that provides power where usual power sources are interrupted. Unfortunately, power supplied by a generator using a locally-stored fuel may provide a limited time to operate and provide power to an affected facility. The time of generator operation can depend on multiple components such as fuel capacity or electrical system power consumption. Typically, there may be a limited amount of fuel available during an emergency, especially when fuel is locally stored. Therefore, an operation of such a generator may require maximum fuel efficiency to extend the runtime to provide power for as long as possible.

The runtime of a generator having a limited fuel supply may be related to the amount of power provided. Generally, increasing power demand increases the amount of fuel required and therefore shortens run time.

Typically, a user needs a generator to operate and provide power for the duration of a power interruption. Many times, the length of the outage is not known at the start of the outage. In an embodiment, the disclosure provides a system for controlling power in a facility that maximizes generator operation time during an outage by increasing real time information feedback and analysis and electrical system load management.

In an embodiment, the system provides a user interface to receive information of electrical system analysis for components of the system. Electrical system properties may include, for example, load percentage and total power consumption of all powered facility components and remaining fuel quantity of the generator. In such an embodiment, analysis of these system properties allows a user to calculate system runtime and decide how to distribute power to components of the system. In this embodiment, a user may operate the generator for a longer period by limiting generator power only to necessary components. With longer operation of the generator, the facility may be able to keep more important components until fuel is resupplied or until utility power is restored.

Some situations may require evacuation of an affected area of a facility. Some embodiments permit the user to remotely control the system interface to allow for safety of any persons needed to evacuate an area. Aside from human safety, the embodiment may allow the electronic systems of the facilities such as servers, to stay safe from damage of a hard shut off. In these embodiments, it may be possible to prolong provision of generator power to important electronic systems and prevent a shutoff, or these embodiments may allow for a safe controlled shutoff prior to total power loss of the facility. These embodiments may prevent the need of a system shutdown of any kind, thus ensuring electrical service continuing. For example, the system can remotely shut off lighting and perhaps air some air circulation if the building is empty.

In an embodiment, FIG. 1 illustrates an exterior view of a facility associated with various power sources and components. Generally, facility 100 represents a common commercial facility but other embodiments of facility 100 can be configured to various sizes, shapes, and purposes. In some embodiments, facility 100 may include more than one building or facility, such as multiple apartment buildings. Some embodiments of facility 100 may include an electrical system that receives power from at least one external power source. In some embodiments, facility 100 may receive power from various power sources. For example, the embodiment of facility 100 illustrated in FIG. 1 may receive power from a utility power source such as grid 110 and a generator power source 104. Grid 110 may include wires 111 and transformer 113, which deliver power to facility 100.

Typically, facility 100 may receive utility power from first wired connection 116 of grid 110 through electrical system component 112. Power may be introduced to building 120 in facility 100 through second wired connection 118. In one embodiment, electrical system component 112 mounted on wall 108 serves to introduce power to building 120 of facility 100.

In some embodiments, facility 100 may receive power from a first power source where a second power source may not be used unless initial power from the first power source is lost. Referring to FIG. 1, facility 100 may not receive generator power from generator 104 unless utility power from grid 110 is lost. In embodiments, the facility may receive power from multiple power sources simultaneously.

In some embodiments, generator 104 may provide power to facility 100. Generator 104 may be located where convenient within or external to the facility. Generator 104 may be disposed within generator building 124. In the embodiment illustrated in FIG. 1, generator building 124 is external to building 120. In embodiments, generator building 124 may house more than one generator.

In some embodiments, generator 104 may be associated with fuel tank 106, which provides the fuel for operation and which may have any shape. In embodiments, generator 104 and fuel tank 106 may be configured as two separate units connected by fuel transfer pipe 122. In some embodiments, fuel tank 106 may be disposed within building 120 or generator building 124. Typically, fuel is stored outside of buildings in view of the potentially dangerous and potentially obnoxious nature of many fuels. FIG. 1 illustrates an embodiment in which fuel tank 106 is disposed outside of building 120. In some embodiments, fuel tank 106 may be located remote from generator 104. In the embodiment illustrated in FIG. 1, fuel tank 106 is located in close proximity of generator 104. Referring to FIG. 1, generator 104, generator building 124, and fuel tank 106 are located at ground level. In other embodiments, generator 104, generator building 124, and fuel tank 106 may be disposed outside building 120 or in any location.

In some embodiments, more than one fuel tank 106 may be associated with generator 104. Embodiments of fuel tank 106 include fuel gauge 126 to communicate the remaining fuel quantity. Fuel pump 125 associated with fuel tank 106 having one or more connections for fuel to pass may be in some embodiments. Other embodiments may include components to allow a passive flow of fuel from fuel tank 106 through pipe 122 to generator 104.

Embodiments may include a connection that transfers power from transformer 113 and generator 104 to electrical unit 112 associated with facility 100. Electrical unit 112 may be disposed as is convenient in or independently of facility 100. In the embodiment illustrated in FIG. 1, one or more electrical system components included in electrical unit 112 may be disposed on wall 108.

Figure 2:
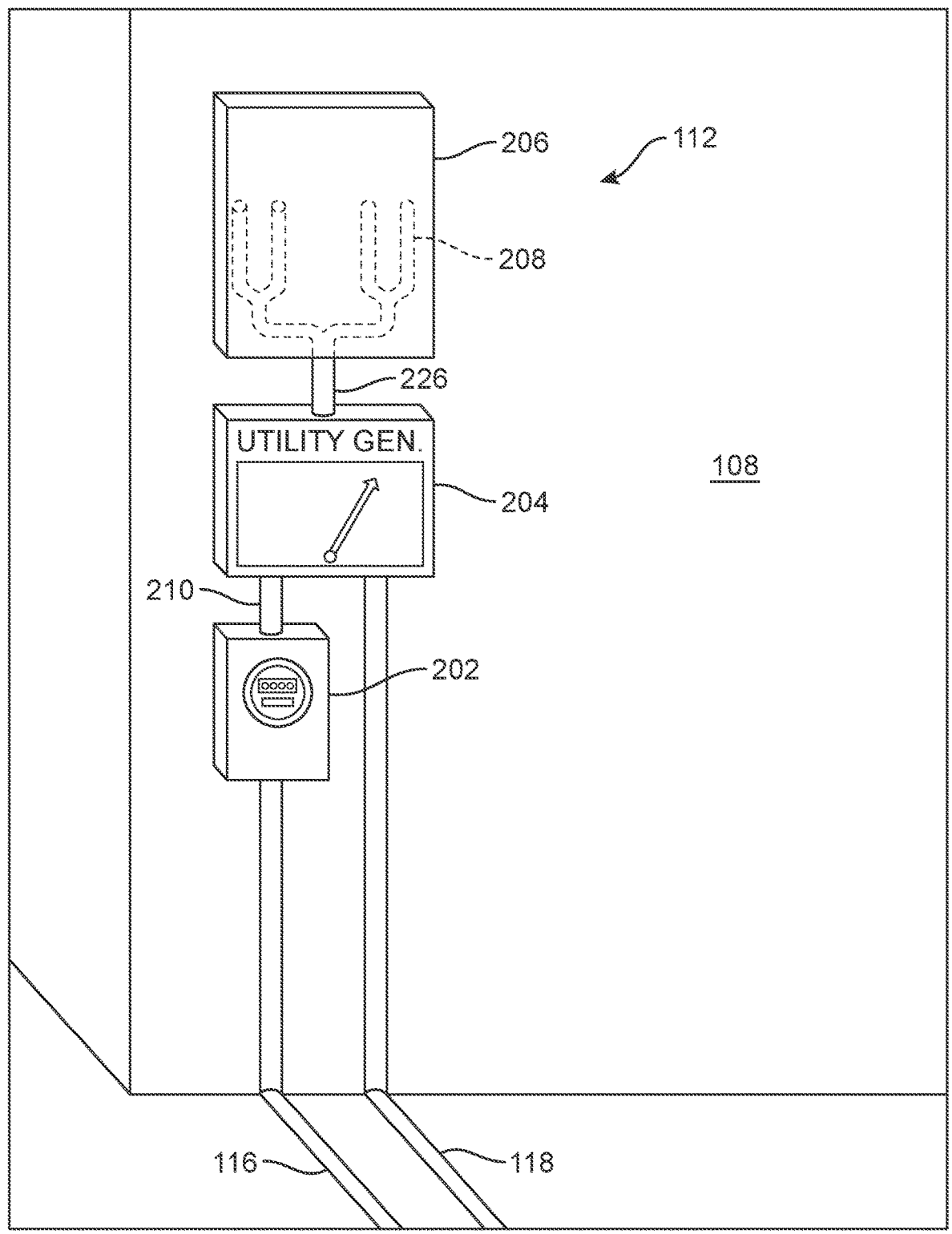
FIG. 2 is a schematic diagram of an embodiment of exterior components of an electrical system associated with a facility.

FIG. 2 illustrates details of an embodiment of electrical unit 112 disposed on wall 108. First wired connection 116 and second wired connection 118 extending from transformer 113 and generator 104 can extend and connect with electrical unit 112. In an embodiment, the wired connection 116 from second wired connection 118 connects to utility power meter 202. Some embodiments may include one or more utility power meters 202.

In embodiments, electrical unit 112 may include an automatic transfer switch (ATS) 204 associated with the electrical system. Automatic transfer switch 204 may receive multiple power leads from multiple power sources such as metered power lead 210 and second wired connection 118.

An embodiment of automatic transfer switch 204 can be configured to allow facility 100 to receive power from grid 110. In an embodiment in which utility power no longer is detected by automatic transfer switch 204, automatic transfer switch 204 can switch the power source of facility 100 from utility power to generator power by activating generator 104. In other embodiments, automatic transfer switch 204 may switch the power source from generator power to utility power after utility meter 202 detects and transfers power from grid 110. In some embodiments, generator 104 may automatically shut off after automatic transfer switch 204 changes the power source of facility 100 from generator power to utility power. Some embodiments of automatic transfer switch 204 may contain manual use components. Manual use components (such as a physical switch) may allow a user to operate automatic transfer switch 204 and physically change the power source of facility 100. Other embodiments of automatic transfer switch 204 may include components for remote operation that may allow a user to change the power source of facility 100 by operating automatic transfer switch 204 from a remote location.

Some embodiments of automatic transfer switch 204 may include external indicia that may represent the respective power source of facility 100. In some embodiments, the external indicia can represent that facility 100 can receive generator power, utility power or power from another power source. Referring to FIG. 2, the embodiment of automatic transfer switch 204 is set to generator power indicated by the dial arrow pointing to "Gen." In other embodiments, the dial arrow may point to "utility" meaning facility 100 is receiving utility sourced power.

In some embodiments, the current flowing from generator 104 may pass through automatic transfer switch 204 and extend through connection 226 that may enter an external housing case disposed on wall 108. The embodiment of housing case 206 may cover and contain any components that transfer power from automatic transfer switch 204 to facility 100. In one embodiment, housing case 206 may contain electrical connecting components 208 (such as power wires) that can pass through both exterior and interior walls of facility 100. In other embodiments, housing 206 may not be necessary where power connections extend from automatic transfer switch 204 and pass through both exterior and interior walls of facility 100.

Figure 3:
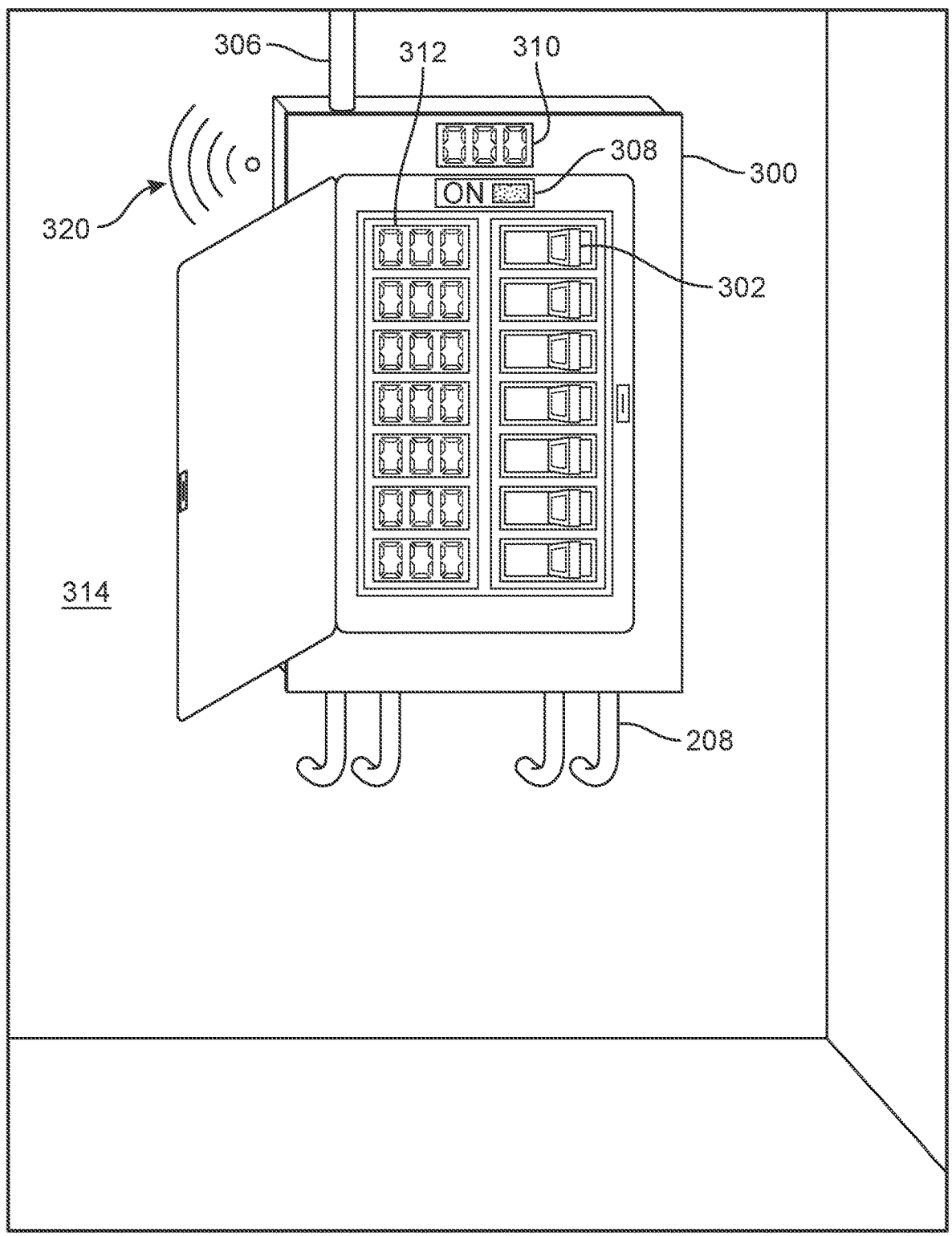
FIG. 3 is a schematic diagram of an embodiment of interior electrical components of an electrical system associated with a facility.

FIG. 3 is a schematic diagram that illustrates typical internal electrical distribution system components disposed within facility 100. In some embodiments, facility 100 can include multiple internal electrical system components. In some embodiments, the internal electrical system components can be located in various areas within facility 100. FIG. 3 illustrates an embodiment having internal electrical distribution system components disposed on wall 314, which may be the interior side of wall 108.

Some embodiments may include an electrical distribution panel 300 disposed within facility 100. Some embodiments can include one or more distribution panels associated with the electrical power system of facility 100. In some embodiments, distribution panel 300 can receive external electric power and distribute it appropriately to necessary components associated with facility 100. In some embodiments, distribution panel 300 can be disposed on an interior wall or a suitable place that provides user access area, such as interior wall 314.

The electrical connecting components 208 within housing 206 (see FIG. 2) may pass through wall 108 to connect and transfer power to distribution panel 300. In an embodiment, distribution panel 300 includes multiple components. In some embodiments, distribution panel 300 can include a main switch that can control the overall power received by distribution panel 300. Preferably, main switch 308 may stay on to allow distribution panel 300 to receive power, but in some embodiments main switch 308 can turn on or shut off the power to distribution panel 300. In some embodiments, main switch 308 can include manual and automatic components that allow a user to control the power flow to distribution panel 300.

In embodiments, main switch 308 can include automatic components such as an automatic transfer switch that may allow power to be turned on or shut off automatically under predetermined conditions. In some embodiments, main switch 308 may include features that provide remote access and control by a user.

In some embodiments, distribution panel 300 can include at least one main power meter 310 with a display. In some embodiments, main power meter 310 can assess and display the overall power consumption of distribution panel 300. As shown in FIG. 3, main power meter 310 provides a digital numerical reading of power consumption. Analog meters would provide similar information.

In some embodiments, main switch 308 may be turned off by the user, which can result in main power meter 310 displaying no numerical value. In other cases, the numerical value that may be displayed on main power meter 310 can represent total power consumption of the components of the electrical system of facility 100. Some embodiments of main power meter 310 can include components for remote communication, such as wireless feature 320.

Distribution panel 300 can distribute power to multiple electrical sources associated with facility 100 through, for example, multiple power breakers. Power breaker 302, which may include manual and automatic control features through wireless control 320, can be configured to distribute power to a single designated electrical source or multiple designated electrical sources. In other embodiments, automatic components of power breaker 302 may include an automatic transfer switch that may be configured to turn power loading electrical components on or off.

In some embodiments, a power meter can be directly associated with power breaker 302. The numerical value displayed changes, depending on what electrical sources are receiving power from power breaker 302. In some embodiments, power breaker 302 may not receive power during certain situations (such as the automatic power switch being shut off) where breaker meter 312 may not display a numerical value. In some embodiments, breaker meter 312 can include components for remote communication. These components may allow the user to view and access the power consumption value of power breaker 302 from a remote location.

Figure 4:
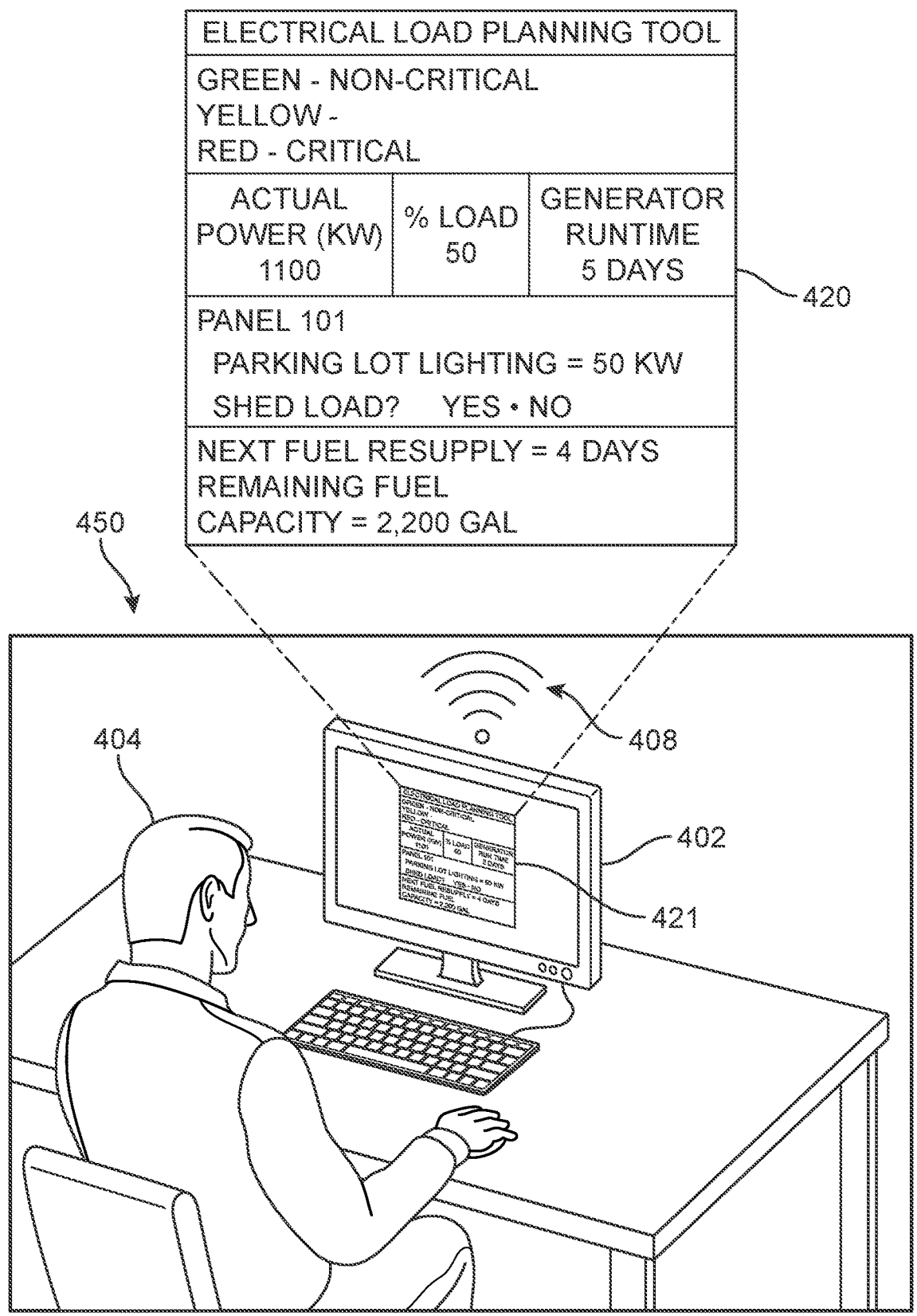
FIG. 4 is a schematic diagram of an embodiment of a user operating a system for controlling power in a facility.

FIG. 4 is a schematic diagram illustrating a user accessing a system 450 for controlling power to a facility. In some embodiments, user 404 may access a display 402 associated with the electrical power system corresponding with facility 100. Some embodiments of display 402 can represent various devices that can access a network such as a computer desktop or laptop, a tablet, or a mobile device. In FIG. 4, display 402 can represent a desktop computer. Display 402 may communicate with remote locations remote from the facility through a wired connection or a wireless connection 408.

In some embodiments, display 402 can allow user 404 to access a system for controlling electrical power to facility 100. FIG. 4 illustrates dashboard 420 of system 450 that can appear on display 402 at dashboard section 421. An embodiment of system 450 may provide information through a simulation of current conditions of the electrical power system of facility 100. A simulation may use known information associated with power consumption of facility 100, particularly of load components, and fuel consumption of generator 104 to predict generator runtime. In some embodiments, system 450 may provide a generator runtime based on system information. In other embodiments, system 450 may allow user 404 to manipulate system information that can affect generator runtime such as component power consumption to predict a new generator runtime. An example can include user 404 shedding system loads to decrease power consumption of facility 100, and increase generator runtime.

In some embodiments, system 450 can include multiple components that provide information that can be manipulated by user 404. In one embodiment, system 450 can include load categorization. In some embodiments, system loads can be categorized by level of importance to the system. In another embodiment, system 450 can organize system loads respective of their locations in facility 100 and in association of other system components such as distribution panels. In another embodiment of system 450, all system loads may be represented by name or an indication recognizable by user 404.

In embodiments, system loads may include a numerical value corresponding with their name and load consumption. System 450 may display a numerical value representing total system power consumption based on the each system load of the electrical system, may calculate generator runtime based on multiple components, or may calculate generator runtime based on total system load power consumption and predetermined generator fuel consumption. In still other embodiments, user 404 of system 450 may be able to adjust load component values to change the total system load power consumption. In still other embodiments, system 450 may recalculate generator runtime after user 404 makes changes to system load values.

The embodiment of system 450 may allow user 404 to simulate electrical system conditions to maximize generator runtime. In some embodiments, user 404 may use system 450 to determine the necessary generator runtime for the electrical system after simulating shutting off or shedding predetermined system loads. In some embodiments, user 404 can use the information and simulations provided by system 450 to determine which real system loads to shut off. In some embodiments, user 404 can manually shut off real system loads of the electrical system associated with facility 100. In some embodiments, user 404 can shut off real system loads and increase generator run time. In other embodiments, system 450 may provide the appropriate information to user 404 to shut down all power to facility 100 to protect vulnerable components or keep the system running as long as possible.

Figure 5:
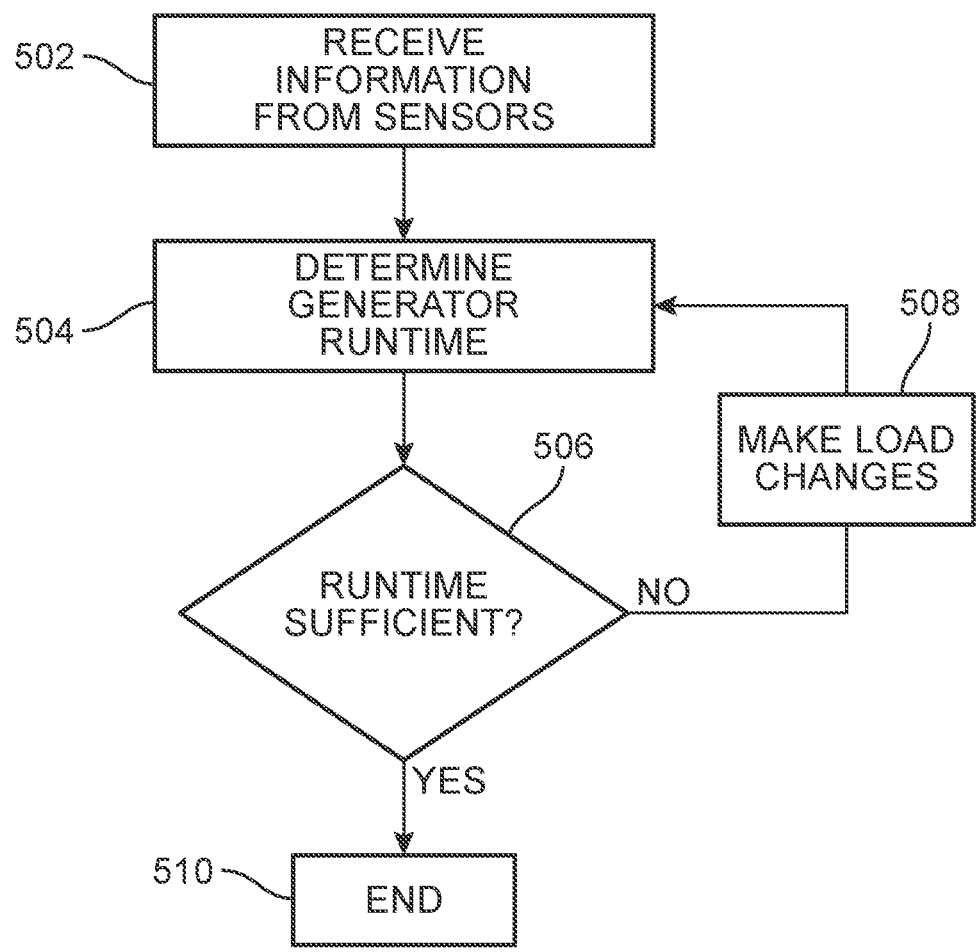
FIG. 5 is a flowchart illustrating a process of an embodiment of a system analyzing data to determine system runtime sufficiency.

FIG. 5 is a flowchart illustrating an embodiment of a process to analyze and utilize data from electrical system sensors to create a sufficient generator run time. As shown in FIG. 5, system 450 may, at step 502, receive information from system sensors (such as power and breaker meters) that can measure power consumption. After receiving this information, system 450 may determine how long the generator can run at the current system power consumption at step 504. In some embodiments, user 404 may conclude at step 506 that the system runtime is sufficient or not sufficient depending on the system being able to run until a designated fuel resupply or utility power is restored. In some embodiments, user 404 may determine that the system runtime is not sufficient, where user 404 may need to shed electrical loads at step 508 to decrease system power consumption and increase system runtime. System 450 may, at step 504, recalculate generator runtime based on system load changes and decreased system power consumption. In some embodiments, user 404 may determine at step 506 that the recalculated generator run time is sufficient because the generator can run for the required timeframe. The calculation then ends at step 508.

Figure 6:
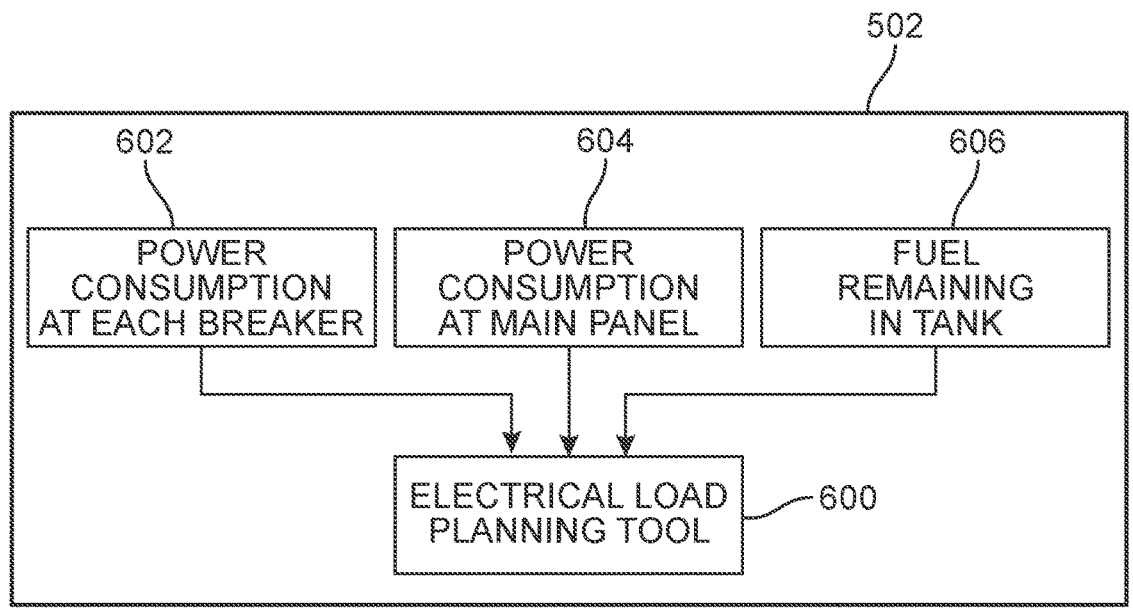
FIG. 6 is a flowchart illustrating a process of an embodiment of a system measuring data from an electrical system.

FIG. 6 illustrates step 502 of an embodiment of FIG. 5 in greater detail. FIG. 6 represents a schematic view of the measurement functions of the system that can control the power of facility 100. In an embodiment, electrical load planning tool 600 may be configured to measure multiple components of the electrical power system of facility 100. Load planning tool 600 can, at step 604, measure power consumption at distribution panel 300 through communication with main power meter 310. The data collected from that measurement may be displayed on system 450 and main power meter 310. The measurement sourced at main power meter 310 may represent the total power consumption of electrical loads associated with distribution panel 300. In the embodiment, electrical load planning tool 600 can also measure the power consumption 602 of each system load associated with power breaker 302. In this embodiment, system 450 may visually show user 404 the power consumption of power breaker 302 through measurement and communication from breaker meter 312.

In an embodiment, system 450 may include components to communicate with breaker meter 312. In some embodiments, communication with either main power meter 310 or breaker meter 312 may be from a remote location, or from any area inside facility 100. In some embodiments, electrical load planning tool 600 can measure real time fuel remaining in fuel tank 106 through the use and communication with a fuel gauge at 606. In some embodiments, user 404 can view the numerical value of the fuel capacity on system 450. As generator 104 operates and consumes fuel, dashboard 400 may display a current value for remaining fuel in fuel tank 106. Typically, the values displayed on dashboard 400 stay updated in real time.

Figure 7:
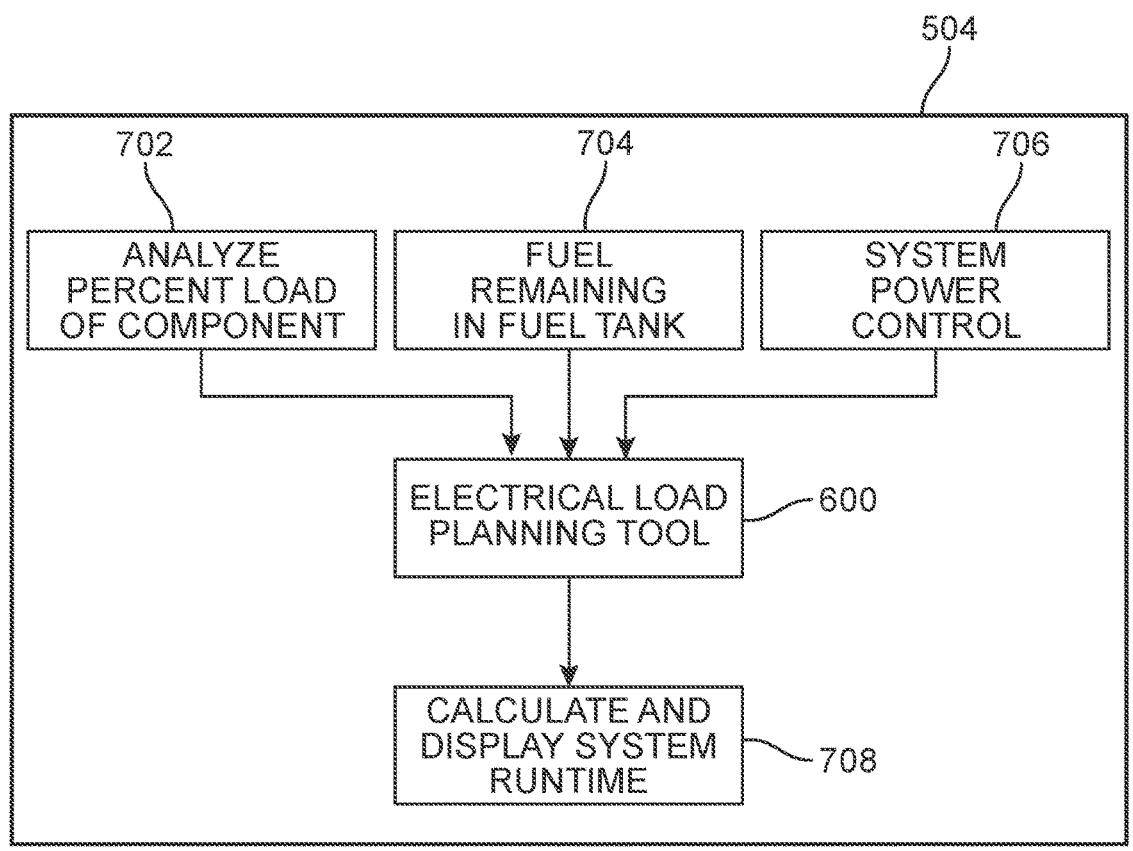
FIG. 7 is a flowchart illustrating a process of an embodiment of a system calculating system runtime.

FIG. 7 illustrates step 504 of FIG. 5 in greater detail. FIG. 7 is a schematic representation of the various calculations that electrical load planning tool 600 may provide to user 404 on system 450. In an embodiment, electrical load planning tool 600 may use system measurements (see FIG. 5) to calculate various values that can allow user 404 to control the electrical power system of facility 100 and predict system runtime. The electrical load planning tool 600 can analyze and calculate the percent load of the electrical power system at step 702 using data received from the electrical system sensors. In some embodiments, electrical load planning tool 600 can, at step 704, measure the remaining fuel in fuel tank 106 to determine how long the system can run based on the fuel quantity. Electrical load planning tool 600 may include components to allow user 404 to shed electrical loads to maximize system runtime. In some embodiments, user 404 may need to shed electrical loads to lower the total percent load and power consumption of the electrical system, as shown at step 706. In this embodiment, electrical load planning tool 600 can use previous calculations at step 702, step 704, and step 706 to assess and reassess at step 708 how long the system can run while using generator power. After user 404 sheds desired system loads, electrical load planning tool 600 may recalculate system runtime to maximize generator efficiency to ensure that the system can run until a fuel resupply or utility power is restored.

Figure 8:
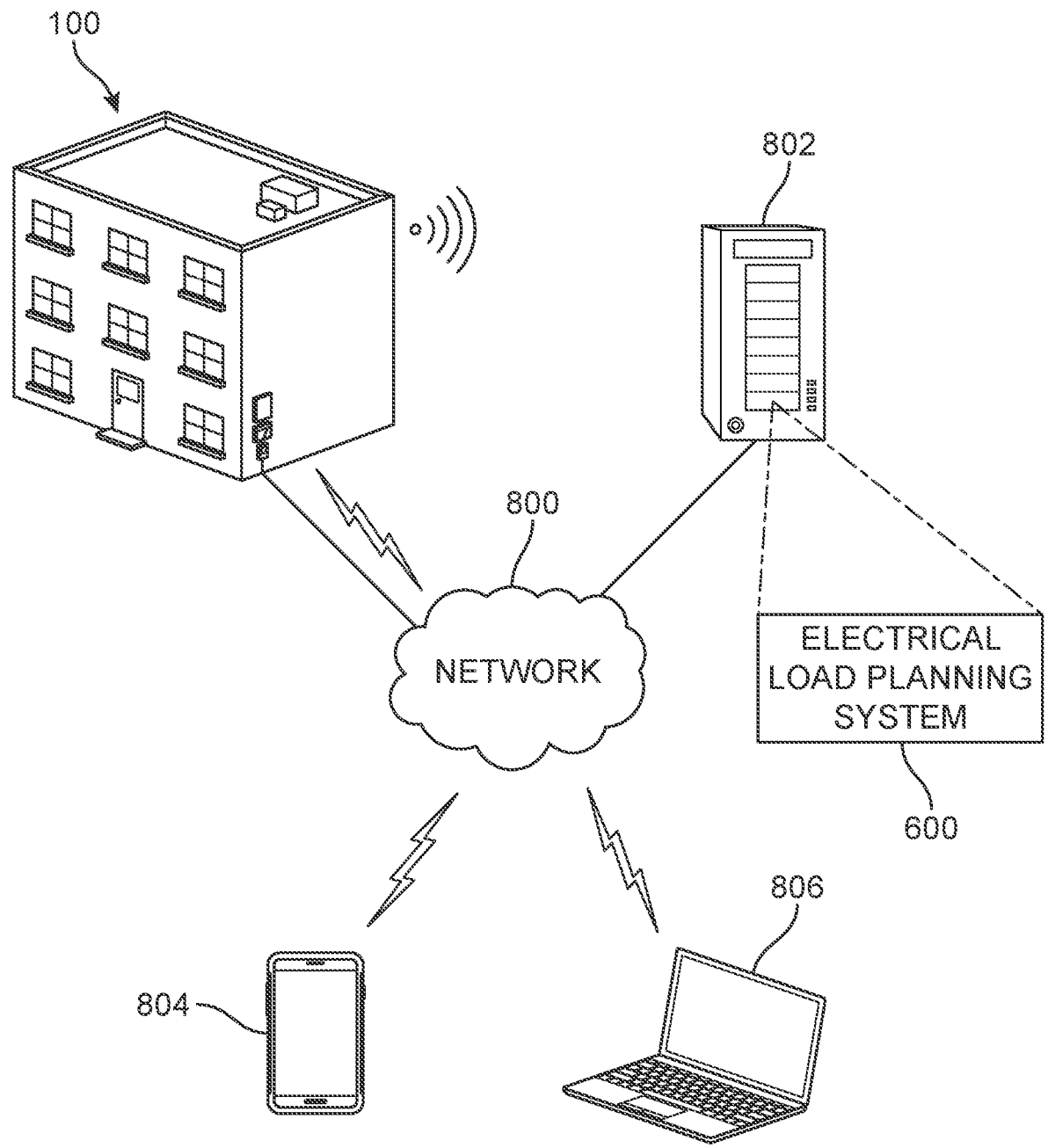
FIG. 8 is a schematic diagram of an embodiment of remote network system.

FIG. 8 is a schematic illustration of a remote network system associated with the electrical power system of facility 100. Some embodiments of electrical load planning tool 600 may include components to allow user 404 to remotely control the electrical power system of facility 100. Referring to an embodiment illustrated in FIG. 8, electrical load planning tool 600 can be connected to a system server. In some embodiments, server 802 may be associated with network 800 which can allow user 404 to have remote access to electrical load planning tool 600. In an embodiment, network 800 may be associated with multiple components. In some embodiments, user 404 may connect to network 800 using mobile device 804. In some embodiments, mobile device 804 may be configured with an application that allows user 404 to access and control electrical load planning tool 600. In other embodiments, user 404 may connect to network 800 using personal computer 806, from which user 404 can access electrical load planning tool 600 to control the electrical power system of facility 100. The embodiment of facility 100 may also be associated with network 800. In some embodiments, server 802 can be disposed within facility 100, but in other embodiments server 802 may be located elsewhere. Facility 100 may be connected to network 800 through a wired connection or a wireless connection. An embodiment including network 800 may allow user 404 to operate electrical load planning tool 600 from within facility 100 or from a different, remote, location.

In embodiments, system 450 may allow user 404 to maximize system runtime under generator power by using simulated data and calculations. For ease of description, the remainder of the detailed description describes a system interface that electronically controls components of the electrical system to maximize system runtime under generator power. The embodiment of the system interface may include features to access and operate electrical load planning tool 600. In an embodiment, electrical load planning tool 600 may be operated in various conditions and scenarios such as power outages. Prior to and during an unplanned power outage, user 404 can access the system interface associated with electrical load planning tool 600 through dashboard 420. The embodiment of the system interface may include components to allow user 404 to access system variables such as system power source, generator fuel capacity, system load percentage, and system run time. In some embodiments, user 404 may use the system interface to make an accurate emergency decision associated with the electrical power to facility 100.

Figure 9:
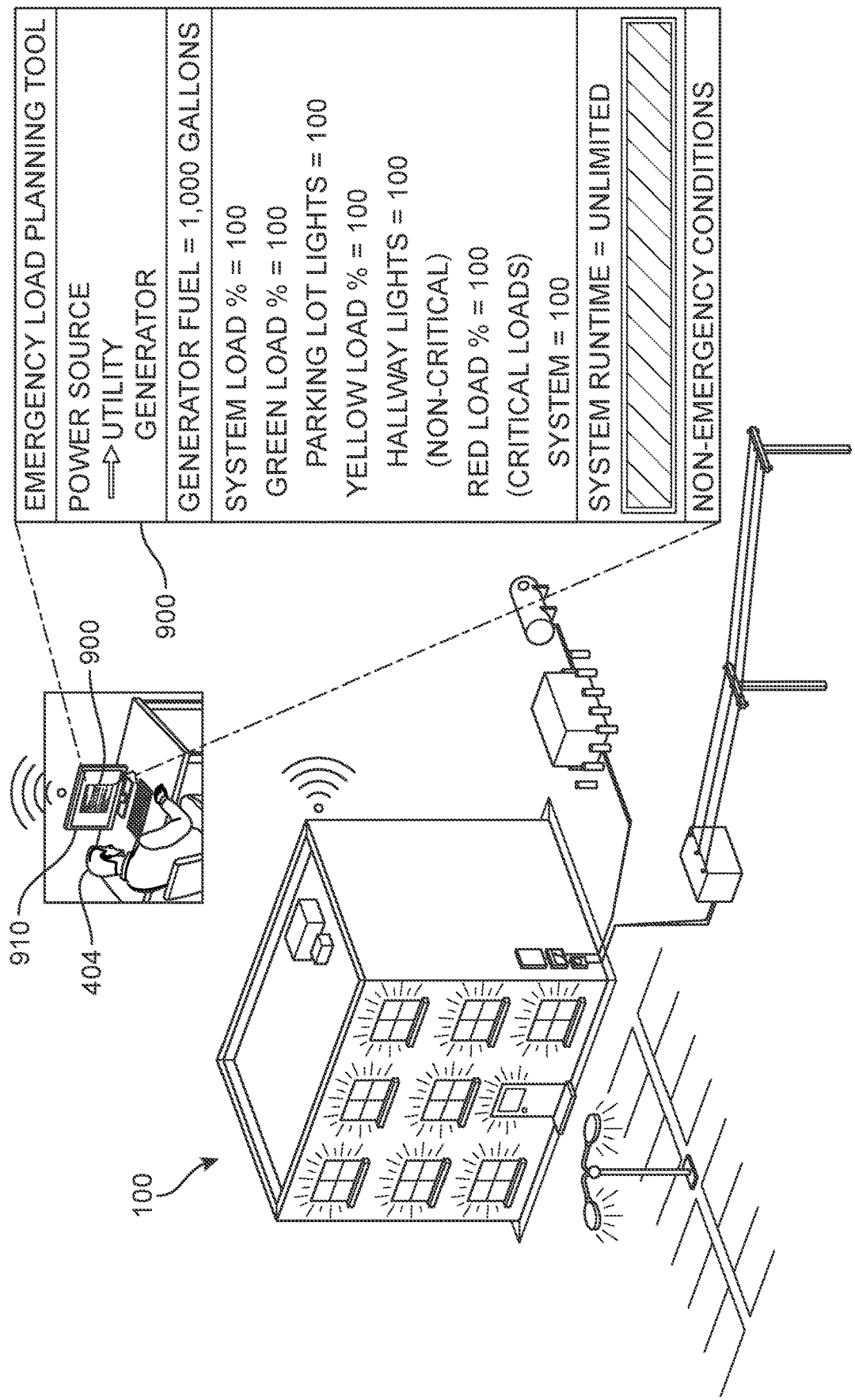
FIG. 9 is a schematic diagram of an embodiment of a facility and a system for controlling power in a facility.

FIG. 9 is an illustration of non-emergency conditions of facility 100 and the view of the system dashboard accessed by user 404. As shown in FIG. 9, facility 100 has electrical power. In the embodiment, both utility and generator power components are not damaged, thus providing grid power to facility 100. In the embodiment, an interface illustrated on dashboard 900 can be associated with computer 910 that allows user 404 to access and control the interactive components of the electrical system. For convenience throughout, "an interface illustrated on dashboard 900" may be identified as dashboard 900. Referring to FIG. 9, user 404 can assess the components displayed on dashboard 900. In some embodiments, user 404 may need to utilize dashboard 900 to analyze emergency system run time. In this embodiment, user 404 may not need to utilize dashboard 900 since facility 100 is not experiencing a power outage.

Loads may be characterized in order of importance. For example, loads that are of low priority may be characterized as low priority or non-critical, or given a color code, such as a 'green' load. Lighting of a parking lot might be considered a green load. Loads of intermediate priority might be identified as 'yellow' loads. Interior hallway lighting may be characterized as a yellow load. Critical loads may be identified as 'red' loads. Loads also may change characterization, depending on circumstances. For example, interior lighting may be a yellow load during the day but a red load at night. The operator will be able to identify and characterize loads in accordance with perceived need.

Figure 10:
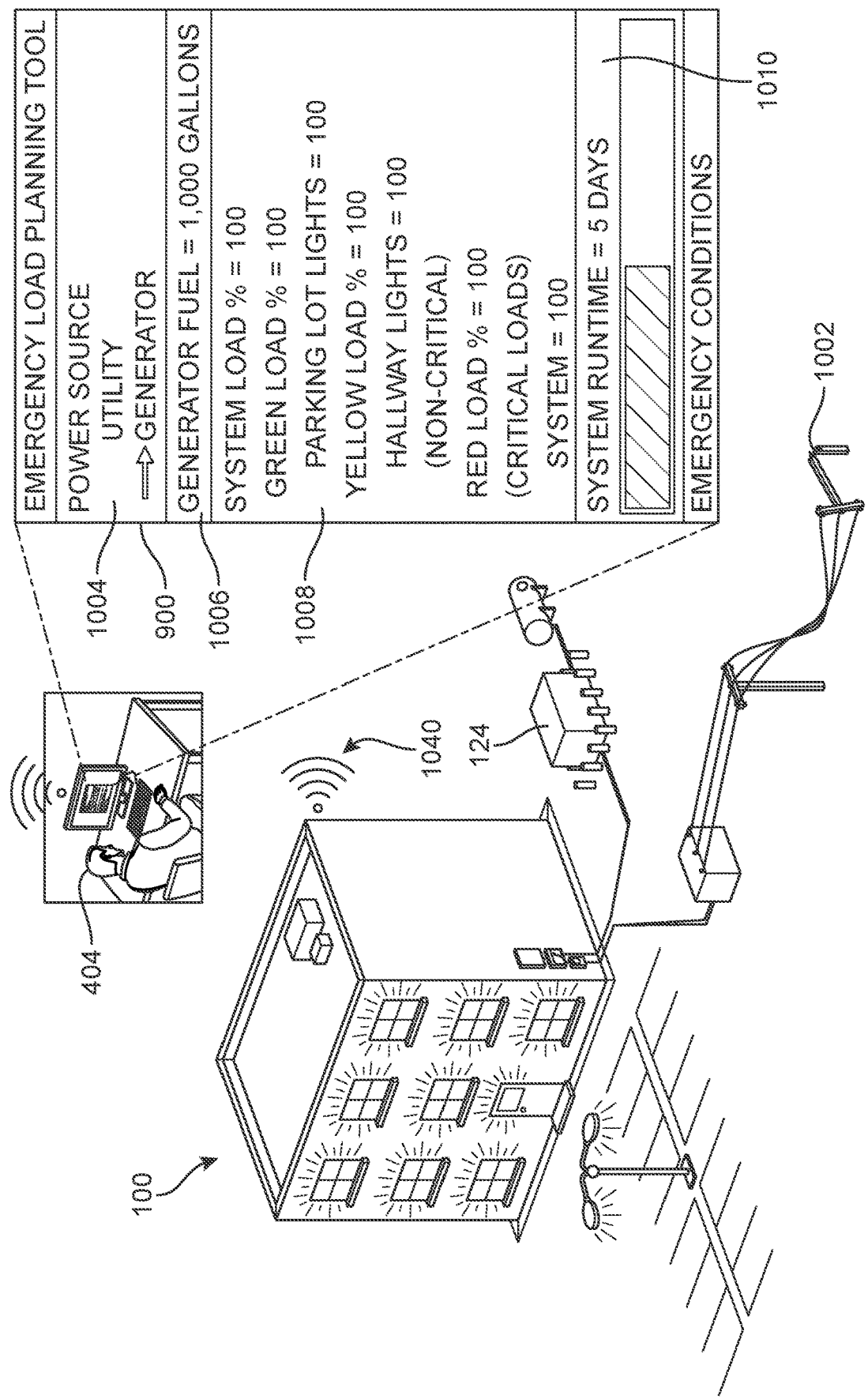
FIG. 10 is a schematic diagram of an embodiment of a facility and a system for controlling power in a facility during a power outage.

FIG. 10 is an illustration of the beginning stages of an emergency power outage affecting facility 100, whether from a natural disaster or accidental damage to the grid power supply. Referring to FIG. 10, utility power components 1002 have been damaged. In some embodiments, generator 104 (see FIG. 1) in generator building 124 can provide power to facility 100 after activation of automatic transfer switch 204 (see FIG. 2), as shown in dashboard section 1004. In the event of facility 100 loses utility power and turns to generator power, the changes in the electrical system data feedback may be viewed and accessed through dashboard 900. In some embodiments, dashboard 900 may receive data feedback from multiple system sensors associated with the electrical system (see FIG. 5 and FIG. 6).

An interface, illustrated as dashboard 900 in FIG. 10, may allow user 404 to access information associated with facility power sources during an emergency power outage. Some embodiments of dashboard 900 may allow user 404 to electronically view and control the status of automatic transfer switch 204 through system components providing communication 1040 to appropriate devices. In FIG. 10, all system component loads display one hundred percent at 1008, meaning that facility 100 is receiving power to all electrical components. In the embodiment, an interface may analyze and calculate system runtime. In the current embodiment, based on the fuel capacity at dashboard section 1006, facility 100 system runtime at dashboard section 1010 may last for five days. In other embodiments, system runtime may be longer or shorter, depending on the different variables that are included in system runtime calculation. In some embodiments, system runtime may need to extend long enough to reach a designated fuel resupply or the time when utility power is restored.

Figure 11:
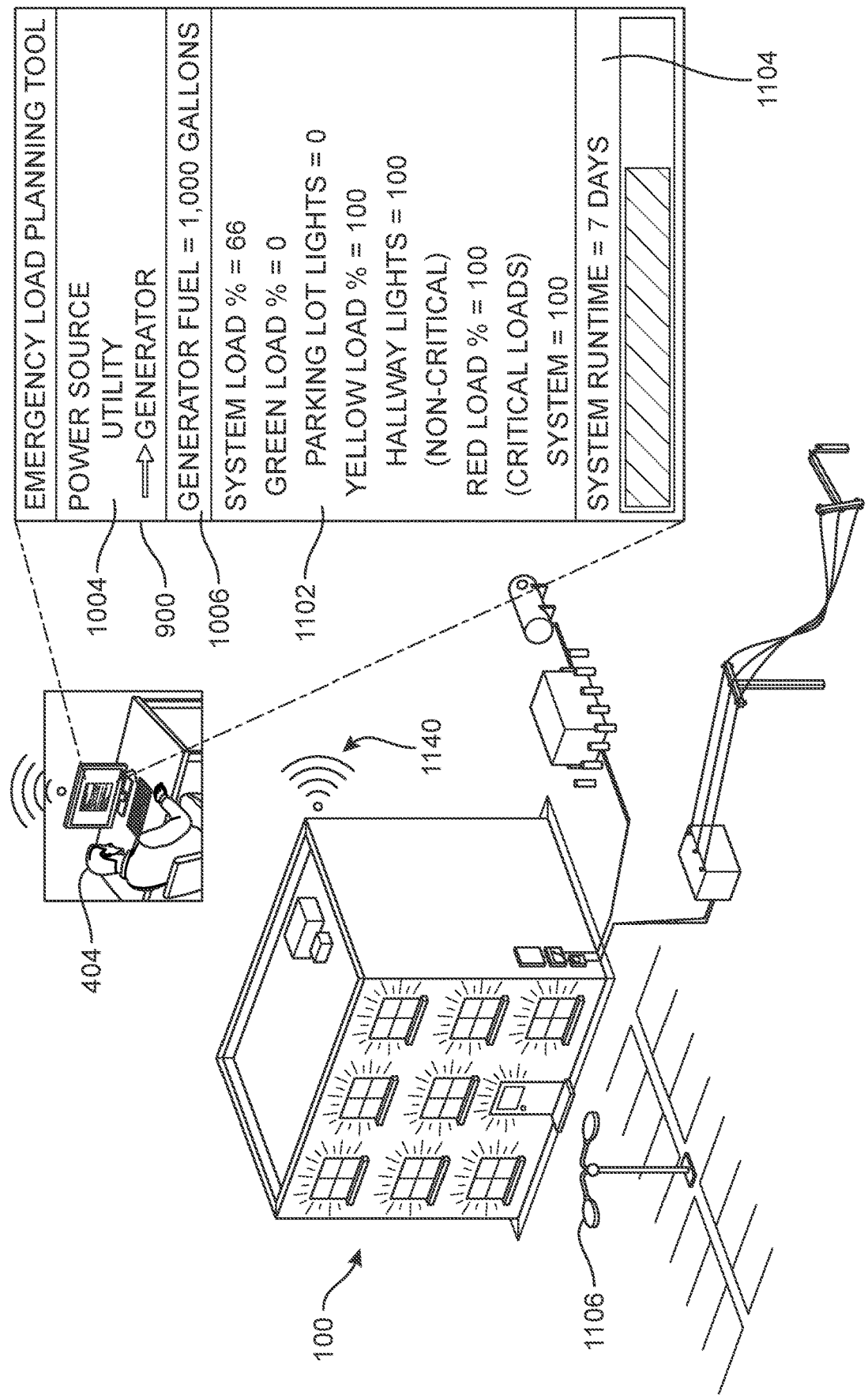
FIG. 11 is a schematic diagram of an embodiment of a facility and a system for controlling power in a facility during a power outage with system load shedding.

FIG. 11 is a continued illustration of FIG. 10 where facility 100 is receiving generator power due to a grid power outage and user 404 can utilize an interface, such as that illustrated as dashboard 900, to control the electrical power system. The dashboard may communicate through wireless connection 1140 with system components to allow user 404 to electronically turn on or turn off system loads. In the current embodiment, user 404 can use dashboard 900 to perform electrical system load shedding to extend the system runtime. In some embodiments, user 404 can shed non-critical loads 1102 to decrease power consumption. An example of a green load may include parking lot lighting 1106 associated with facility 100. In some embodiments, user 404 may shed the total load of a component, meaning the load percentage changes from one hundred percent to zero. In other embodiments, user 404 may partially shed a load where a load may change from one hundred percent to a predetermined load percentage. In an embodiment of a total load shed, green loads such as parking lot lighting 1106 may be completely turned off. In the embodiment of a partial load shed, parking lot lighting 1106 may continue to receive power to predetermined light fixtures.

Electrical system runtime would be expected to increase if other loads are shed. Referring to FIG. 11, the embodiment of the interface displayed on dashboard 900 illustrates the same generator fuel amount in dashboard section 1006 as shown in FIG. 10, while system load 1102 has decreased due to green load shedding. The embodiment of electrical load planning tool 600 may recalculate system run time due to the system load changes. Typically, system runtime 1104 is expected to increase due to decreased power consumption of the electrical power system.

Figure 12:
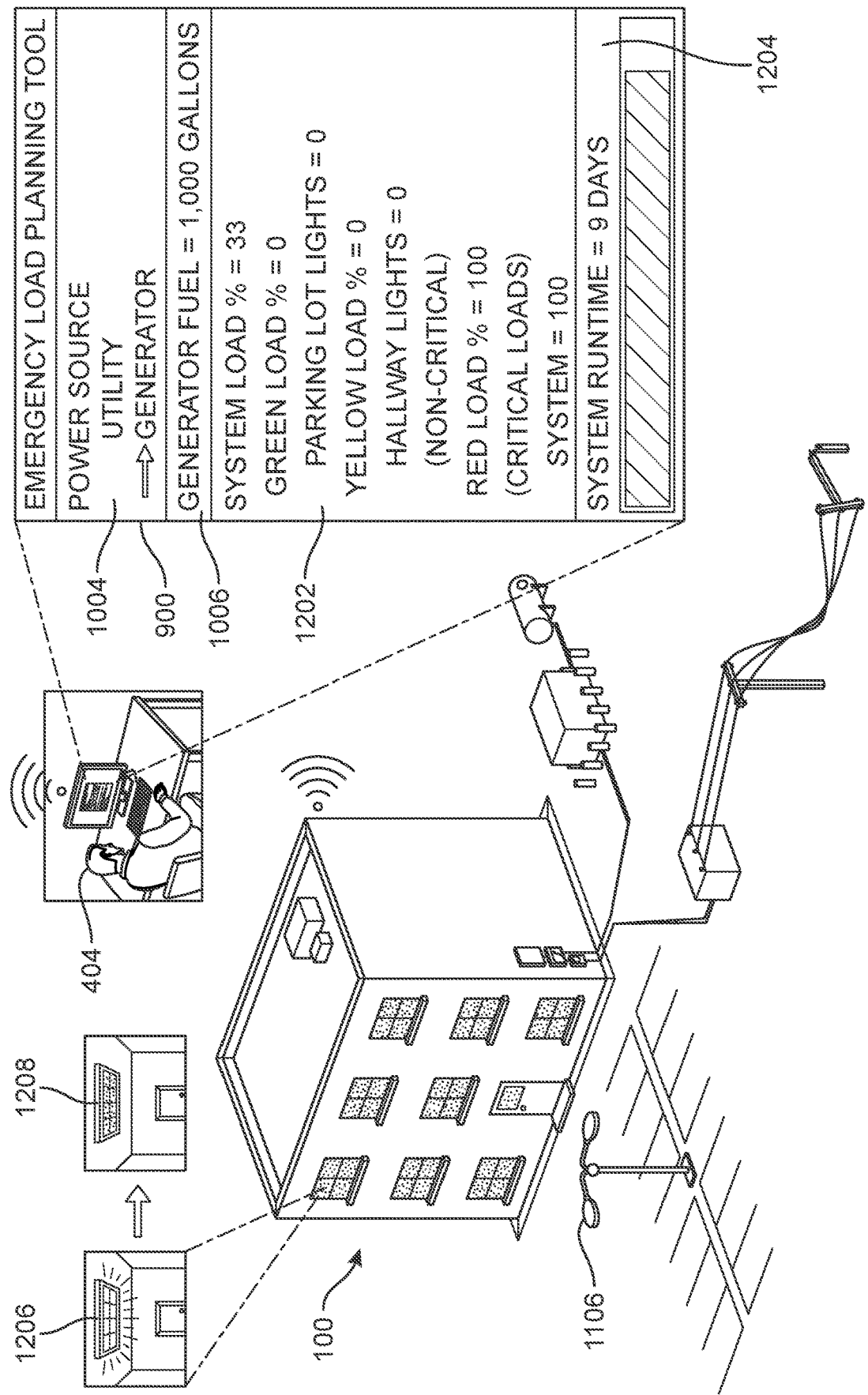
FIG. 12 is a schematic diagram of an embodiment of a facility and a system for controlling power in a facility during a power outage with further system load shedding.

FIG. 12 is a continued illustration of FIG. 10 and FIG. 11 showing facility 100 under a power outage with user 404 operating an interface illustrated in dashboard 900. In this embodiment, facility 100 may receive generator power due to a utility power outage and user 404 can access dashboard 900 to maximize system runtime. In the current embodiment, green system loads have been shed at 1208 by user 404. Typically, green loads are shed first because green loads are non-critical. In some embodiments, user 404 may need to continue increasing system runtime through further system load shedding.

In some embodiments, user 404 may use dashboard 900 to analyze and access "yellow" system loads. Dashboard 900 may allow user 404 to turn on, or turn off yellow system loads through communication of system components. In some embodiments, user 404 may partially or completely shed yellow system loads at dashboard section 1202. An example of a yellow load component may include the interior hallway lighting of facility 100. In some embodiments, the interior hallway light may receive power at dashboard section 1206 until user 404 sheds the system load. In some embodiments, user 404 may operate dashboard 900 to shed all yellow loads. In the current embodiment, green and yellow system loads have been shed by user 404 to prolong system runtime for the remaining "red" critical loads of the electrical power system of facility 100. Typically, red critical loads are never turned off unless user 404 allows for system shutdown. Referring to FIG. 12, system runtime has increased at dark suits 1204 in comparison to FIG. 10 and FIG. 11 due to the system load shed of all power loads.

Figure 13:
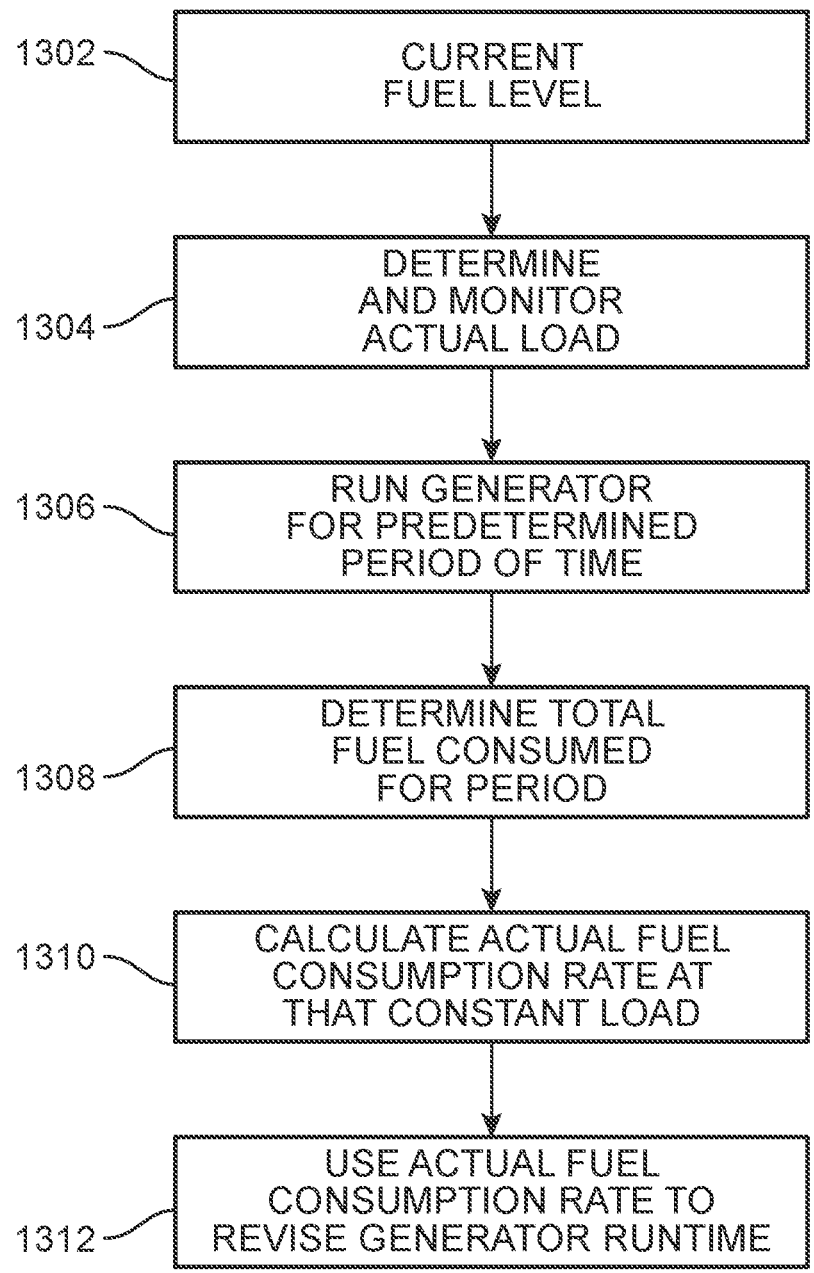
FIG. 13 is a flowchart illustrating a process of an embodiment of a system determining actual generator fuel consumption rate.

FIG. 13 is a flow chart illustrating the process of determining fuel consumption rate of generator 104. In some embodiments, electrical load planning tool 600 may include the option to determine the actual fuel consumption rate of generator 104. Electrical load planning tool 600 may calculate fuel consumption of generator 104 using various components and processes. At step 1302, electrical load planning tool 600 may measure the generator and fuel tanks current fuel level using communication with fuel gauges associated with the generator and fuel tank. In the embodiment, electrical load planning tool 600 may use the meters at the distribution panels to measure, determine, and monitor actual system load at step 1304. Electrical load planning tool 600 may measure at step 1306 elements of fuel consumption while the generator runs for a predetermined period of time. Electrical load planning tool 600 may use those measured elements of fuel consumption at step 1308 to determine the total quantity of fuel consumed during the predetermined period of time. Electrical load planning tool 600 may calculate the actual fuel consumption rate at the constant load measured at the distribution panel meters at step 1310. Electrical load planning tool 600 may use the actual fuel consumption rate at step 1312 to revise system runtime as system loads change during an emergency electrical power outage.

Only the Energy Storage Device Operates

The previous section relates to a circumstance in which the system has only a generator to provide power if grid power is interrupted or degraded. Such a generator typically is powered by a hydrocarbon fuel such as diesel fuel, kerosene, gasoline, natural gas, or coal. In other embodiments, a system may have only an energy storage device to provide power when grid power is not available or is compromised. In such embodiments, a facility associated with the energy storage device receives power from the energy storage device when required.

Figure 14:
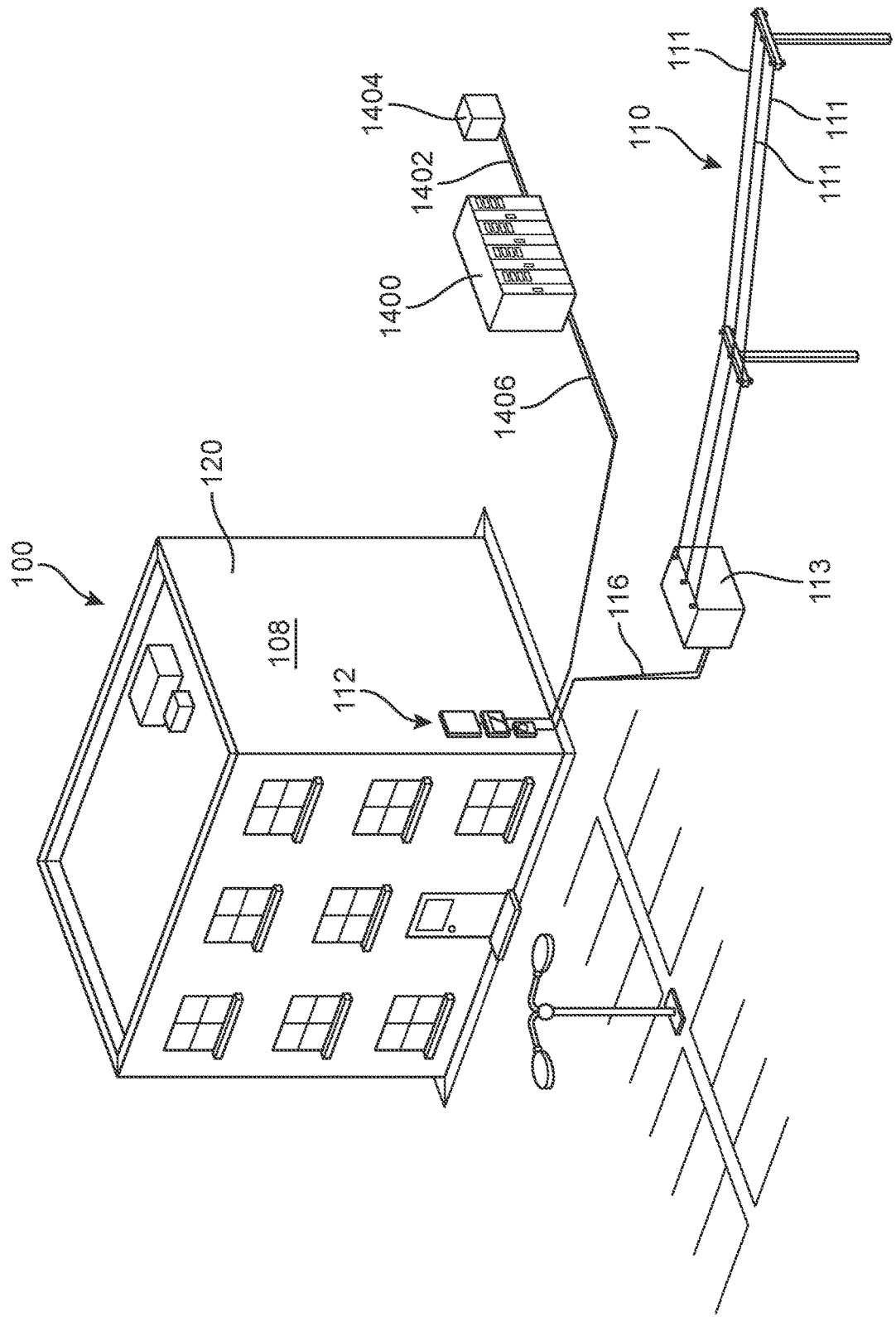
FIG. 14 is a schematic diagram of an embodiment of a facility and associated components of an electrical system.

In an embodiment, FIG. 14 illustrates an exterior view of a facility associated with various power sources and components. FIG. 14 illustrates some of the features described above and shown in earlier FIG. 1. However, FIG. 14 illustrates that facility 100 may receive power from energy storage device 1400, as generator 104 is not present in this embodiment. As seen in FIG. 14, power may be introduced to building 120 in facility 100 through second wired connection 1406.

Referring to FIG. 14, facility 100 may not receive energy storage device power from energy storage device 1400 unless utility power from grid 110 is lost or compromised. In embodiments, the facility may receive power from multiple power sources simultaneously.

In some embodiments, energy storage device 1400 may provide power to facility 100. Energy storage device 1400 may be located where convenient within or external to the facility. In some embodiments, energy storage device 1400 may be associated with regenerator 1404, which charges the energy storage device. In embodiments, regenerator 1404 may be any device for restoring energy to energy storage device 1400. In some cases, regenerator 1404 may be a wind- or water-driven device. The regenerator also may comprise solar panels. Any combination of technologies may be used. Power or energy produced by regenerator 1404 is introduced to energy storage device 1400 through power transfer connection 1402. Referring to FIG. 14, energy storage device 1400 and regenerator 1404 are located at ground level. In other embodiments, energy storage device 1400 and regenerator 1404 may be disposed inside building 120 or in any location.

Embodiments may include a connection that transfers power from box 114 and energy storage device 1400 to electrical unit 112 associated with facility 100. Electrical unit 112 may be disposed as is convenient in or independently of facility 100. In the embodiment illustrated in FIG. 14, one or more electrical system components included in electrical unit 112 may be disposed on wall 108.

Figure 15:
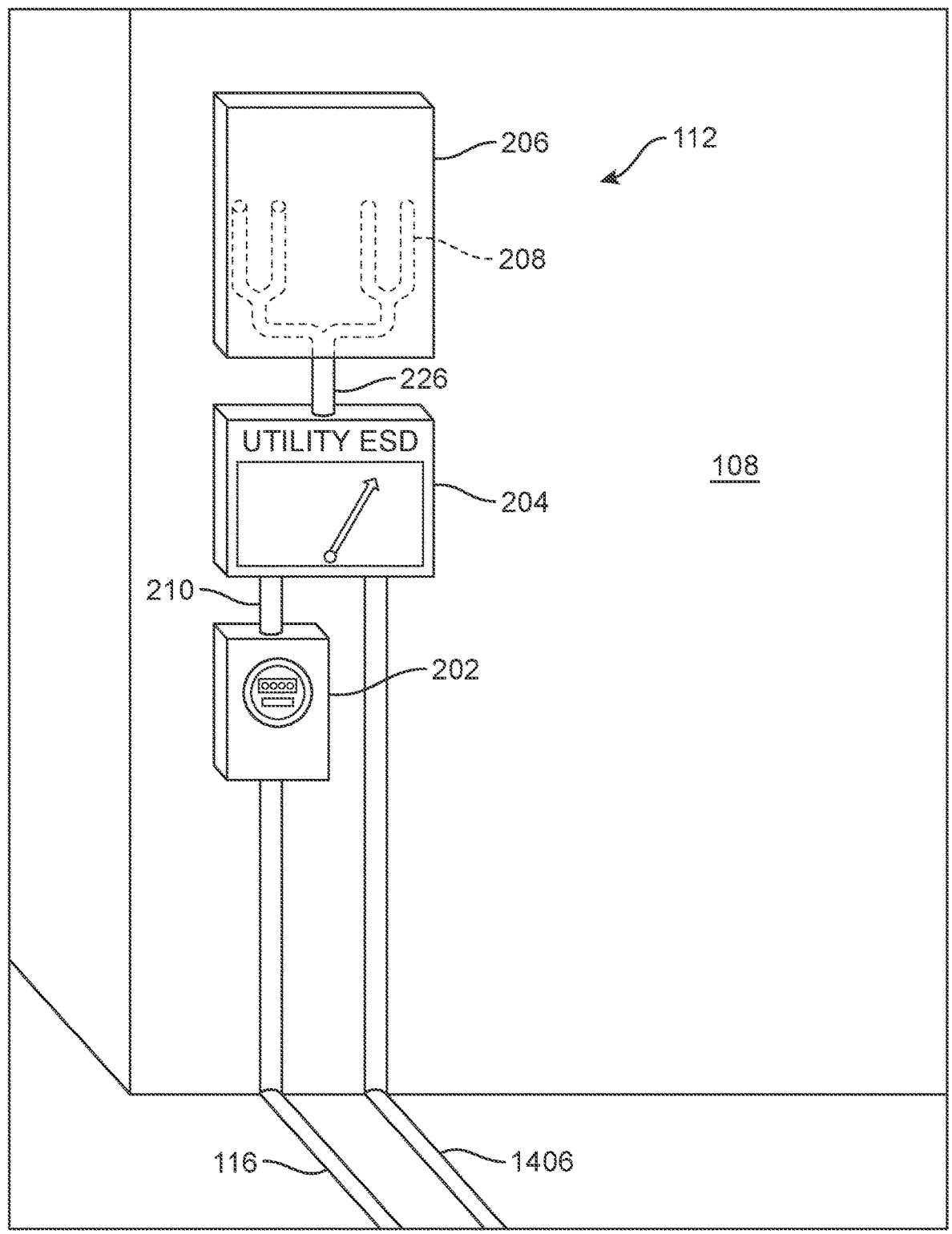
FIG. 15 is a schematic diagram of an embodiment of exterior components of an electrical system associated with a facility.

FIG. 15 illustrates details of an embodiment of electrical unit 112 disposed on wall 108. Many of the features in FIG. 15 are shown in earlier FIG. 2 and are described above. However, as can be seen, automatic transfer switch 204 selects between utility power and energy storage device power. FIG. 15 also shows that second wired connection 1406 carries energy storage device power to automatic transfer switch 204, which may receive multiple power leads.

Referring to FIG. 15, the embodiment of automatic transfer switch 204 is set to energy storage device power indicated by the dial arrow pointing to "ESD." In other embodiments, the dial arrow may point to "utility", meaning facility 100 is receiving utility sourced power.

In some embodiments, energy storage device 1400 will have its own, integrated, automatic transfer switch. In such embodiments, auto transfer switch 204 may be used as an indicator of utility power source or another power source.

In embodiments having an ESD, a typical internal electrical distribution system may include components disposed within facility 100. These components of electrical distribution panel 300 may carry out the functions and purposes described above, and as they relate to FIG. 3.

Figure 16:
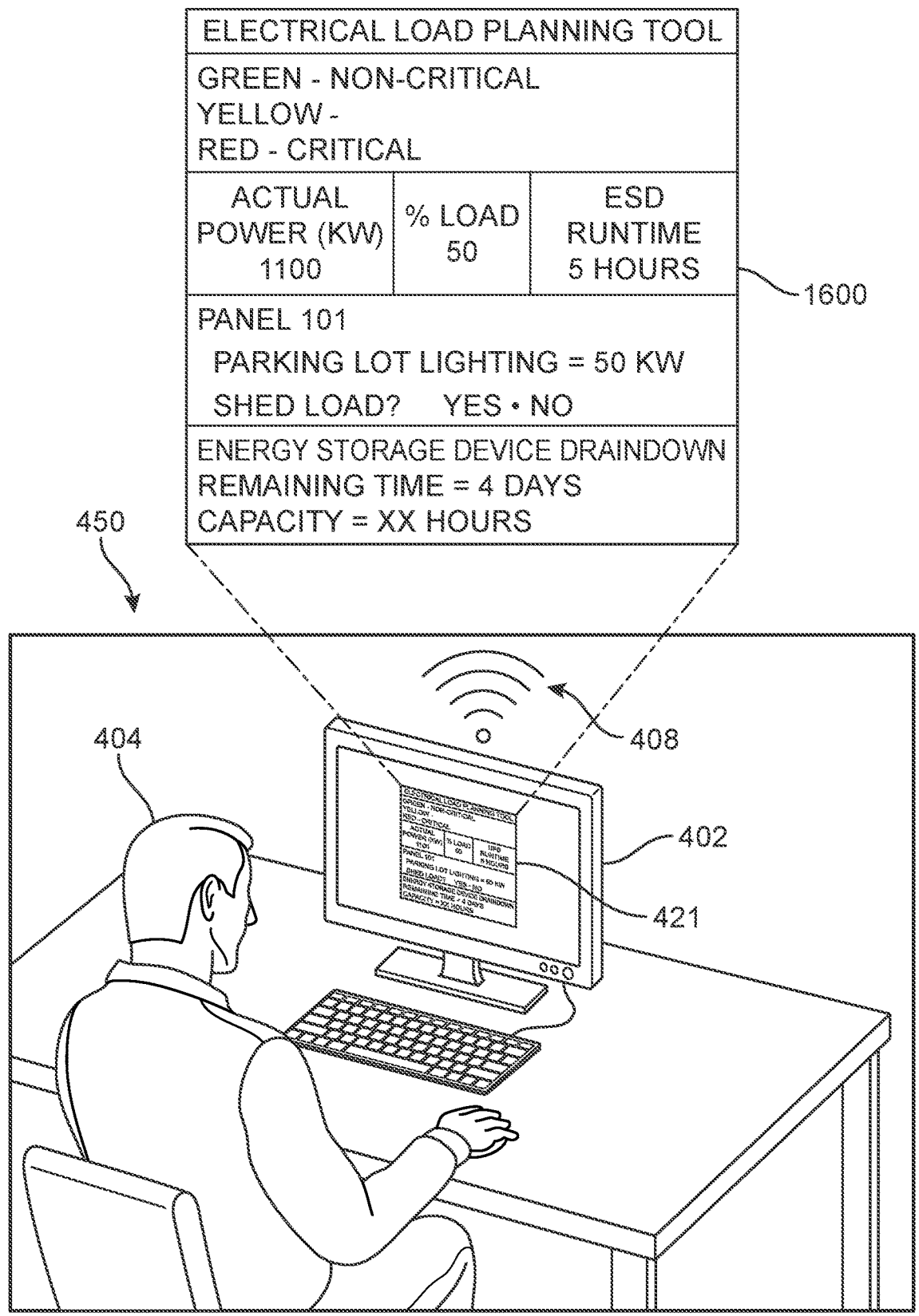
FIG. 16 is a schematic diagram of an embodiment of a user operating a system for controlling power in a facility.

FIG. 16 is a schematic diagram illustrating a user accessing a system 450 for controlling power to a facility. FIG. 16 illustrates some of the features described above and shown in earlier FIG. 4. FIG. 4 illustrates dashboard 420 as it relates to a system having a generator and to report fuel remaining. Similarly, dashboard 1600 relates to energy storage device runtime remaining and energy storage device drain time.

A simulation may use known information associated with power consumption of facility 100, particularly of load components, and energy consumption of energy storage device 1400 to predict energy storage device 1400 runtime. In some embodiments, system 450 may provide an energy storage device runtime based on system information. In other embodiments, system 450 may allow user 404 to manipulate system information that can affect energy storage device drain down, such as component power consumption to predict a new energy storage device drain down. An example can include user 404 shedding system loads to decrease power consumption of facility 100, and increase energy storage device drain down. As described above, all system loads may be represented by name or an indication recognizable by user 404. Loads may be characterized in order of importance. For example, as set forth above, loads may be categorized as "green," "yellow," or "red," and system loads may include a numerical value corresponding with their name and load consumption for display on dashboard 1600.

Figure 17:
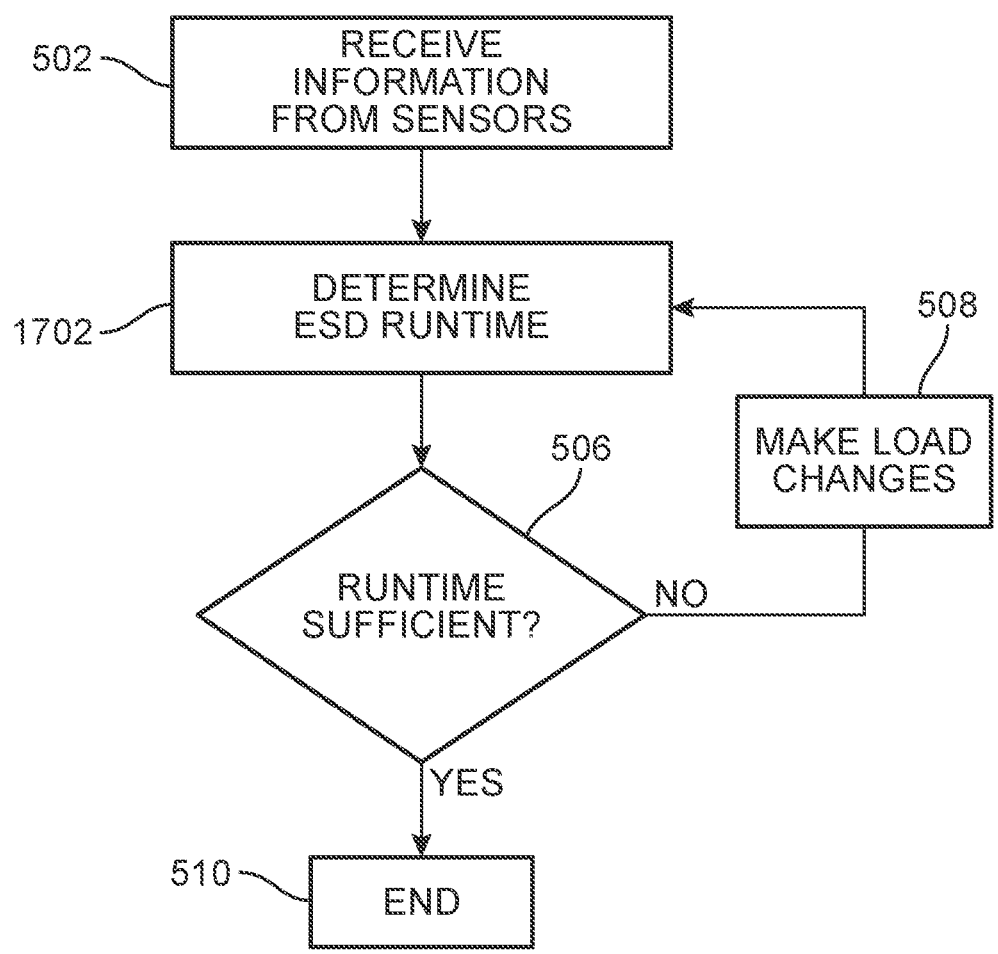
FIG. 17 is a flowchart illustrating a process of an embodiment of a system analyzing data to determine system runtime sufficiency.

FIG. 17 is a flowchart illustrating an embodiment of a process to analyze and utilize data from electrical system sensors to create a sufficient generator run time. As shown in FIG. 17, system 450 may, at step 1702, receive information from system sensors (such as power and breaker meters) that can measure power consumption. After receiving this information, system 450 may determine how long the energy storage device 1400 can run at the current system power consumption at step 1702. In some embodiments, user 404 may conclude at step 506 that the system runtime is sufficient or not sufficient depending on the system being able to run until a designated energy resupply or utility power is restored. In some embodiments, user 404 may determine that the system runtime is not sufficient, where user 404 may need to shed electrical loads at step 508 to decrease system power consumption and increase system runtime. System 450 may, at step 1702, recalculate energy storage device runtime based on system load changes and decreased system power consumption. In some embodiments, user 404 may determine at step 506 that the recalculated energy storage device run time is sufficient because the energy storage device can run for the required timeframe. If runtime is sufficient, calculations cease in step 510.

Figure 18:
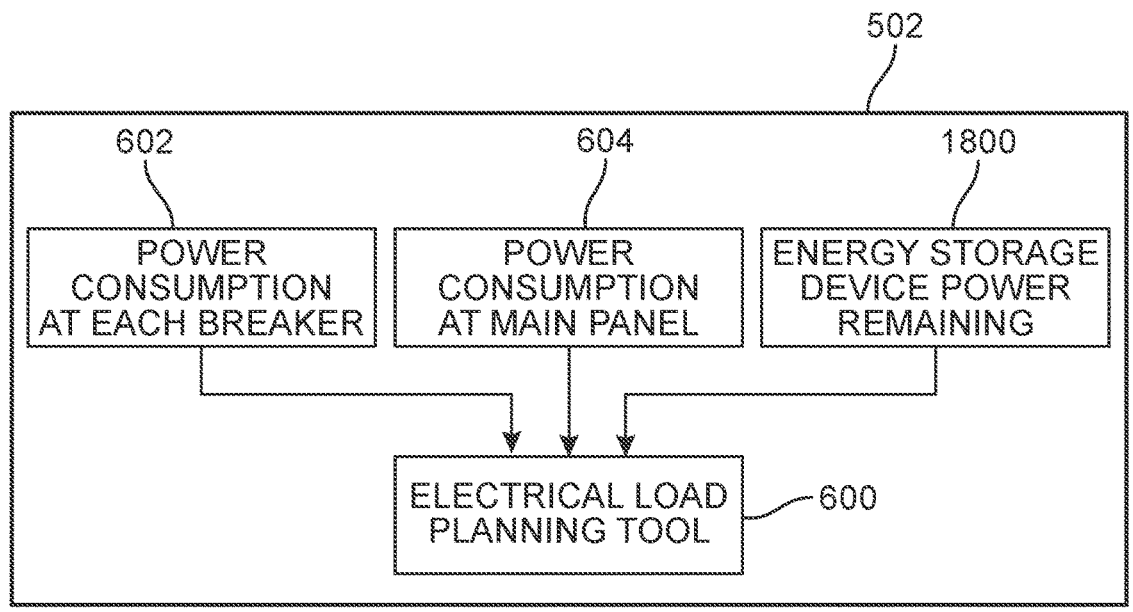
FIG. 18 is a flowchart illustrating a process of an embodiment of a system measuring data from an electrical system.

FIG. 18 illustrates step 502 of an embodiment of FIG. 17 in greater detail. FIG. 18 illustrates some of the features described above and depicted on FIG. 6. These features operate as described above to determine energy storage device power remaining at step 1800, rather than fuel remaining in a generator tank, as shown at step 606 of FIG. 6.

In embodiments, as energy storage device 1400 operates and consumes energy, dashboard 1620 may display a current value for remaining energy. Typically, the values displayed on dashboard 1620 stay updated in real time.

Figure 19:
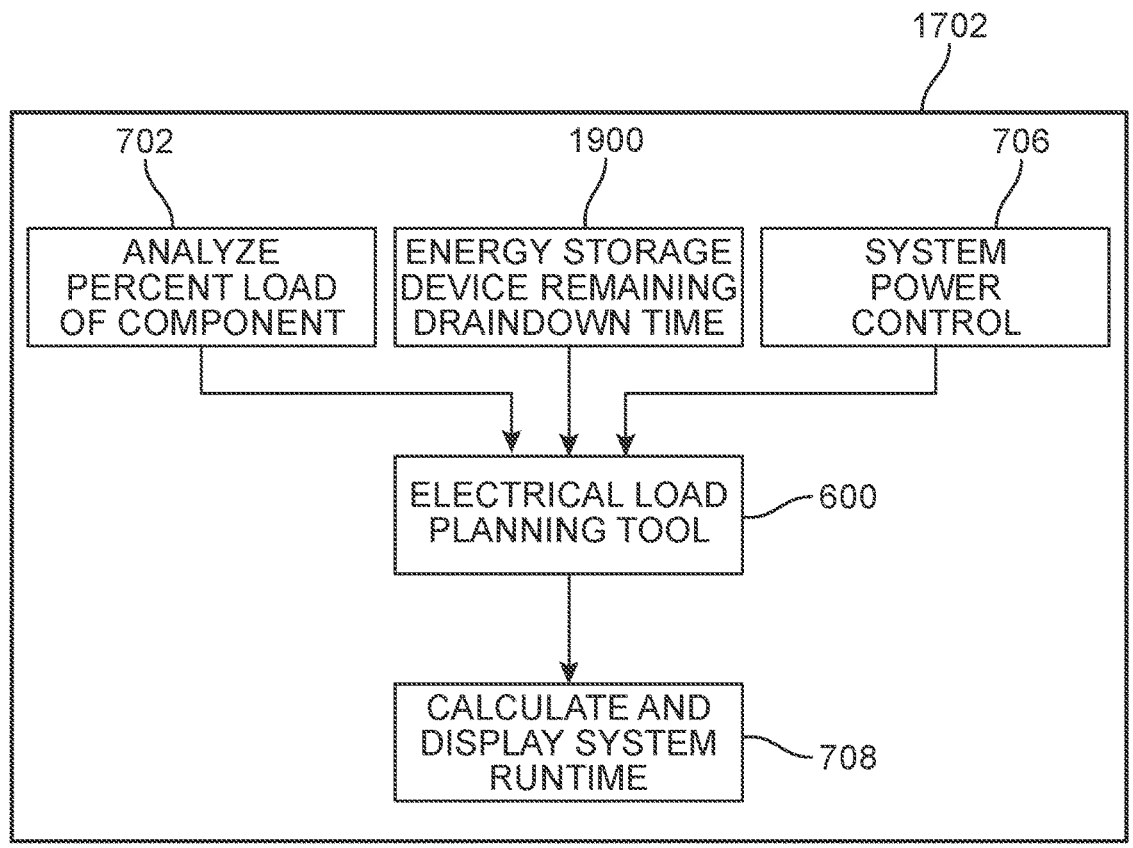
FIG. 19 is a flowchart illustrating a process of an embodiment of a system calculating system runtime.

FIG. 19 illustrates step 1702 of FIG. 17 in greater detail. FIG. 19 is a schematic representation of the various calculations that electrical load planning tool 600 may provide to user 404 on system 450. In some embodiments, electrical load planning tool 600 can, at step 1900, measure the energy remaining in energy storage device 1400 to determine how long the system can run based on the energy quantity. Electrical load planning tool 600 may include components to allow user 404 to shed electrical loads to maximize system runtime. In some embodiments, user 404 may need to shed electrical loads to lower the total percent load and power consumption of the electrical system, as shown at step 706. In this embodiment, electrical load planning tool 600 can use previous calculations at step 702, step 1900, and step 706 to assess and reassess at step 708 how long the system can run while using energy storage device power. After user 404 sheds desired system loads, electrical load planning tool 600 may recalculate system runtime to maximize energy storage device efficiency to ensure that the system can run until an energy resupply or until utility power is restored.

In some embodiments having an energy storage device, a remote network system is associated with the electrical power system of facility 100. Components of the network system carry out the functions and purposes described above and as they relate to FIG. 8.

In embodiments, system 450 may allow user 404 to maximize system runtime under energy storage device power by using simulated data and calculations. For ease of description, the remainder of the detailed description of this system describes a system interface that electronically controls components of the electrical system to maximize system runtime under energy storage device power. The embodiment of the system interface may include features to access and operate electrical load planning tool 600. In an embodiment, electrical load planning tool 600 may be operated in various conditions and scenarios such as power outages. Prior to and during an unplanned power outage, user 404 can access the system interface associated with electrical load planning tool 600 through dashboard 1600. The embodiment of the system dashboard may include components to allow user 404 to access system variables such as system power source, energy storage device energy capacity, system load percentage, and system run time. In some embodiments, user 404 may use the system dashboard to make an accurate emergency decision associated with the electrical power to facility 100.

Figure 20:
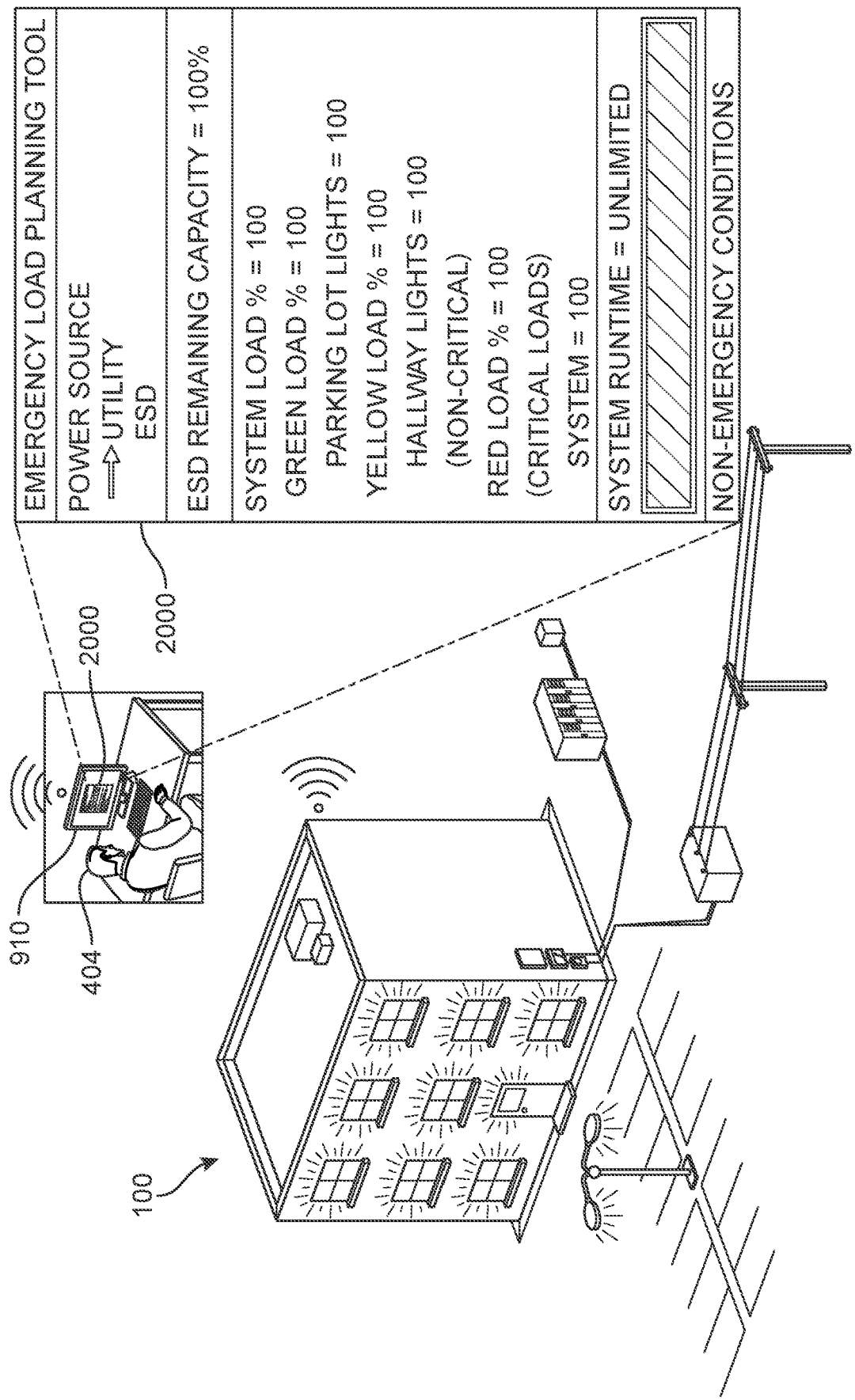
FIG. 20 is a schematic diagram of an embodiment of a facility and a system for controlling power in a facility.

FIG. 20 is an illustration of non-emergency conditions of facility 100 and the view of the system dashboard accessed by user 404. FIG. 20 illustrates some of the features described above and illustrated in FIG. 9. However, FIG. 20 illustrates on dashboard 2000 that facility 100 may receive power from energy storage device 1400, as generator 104 is not present in this embodiment.

Referring to FIG. 20, user 404 can assess the components displayed on interface 2000. In some embodiments, user 404 may need to utilize dashboard 2000 to analyze emergency system run time. In this embodiment, user 404 may not need to utilize dashboard 2000 since facility 100 is not experiencing a power outage.

Figure 21:
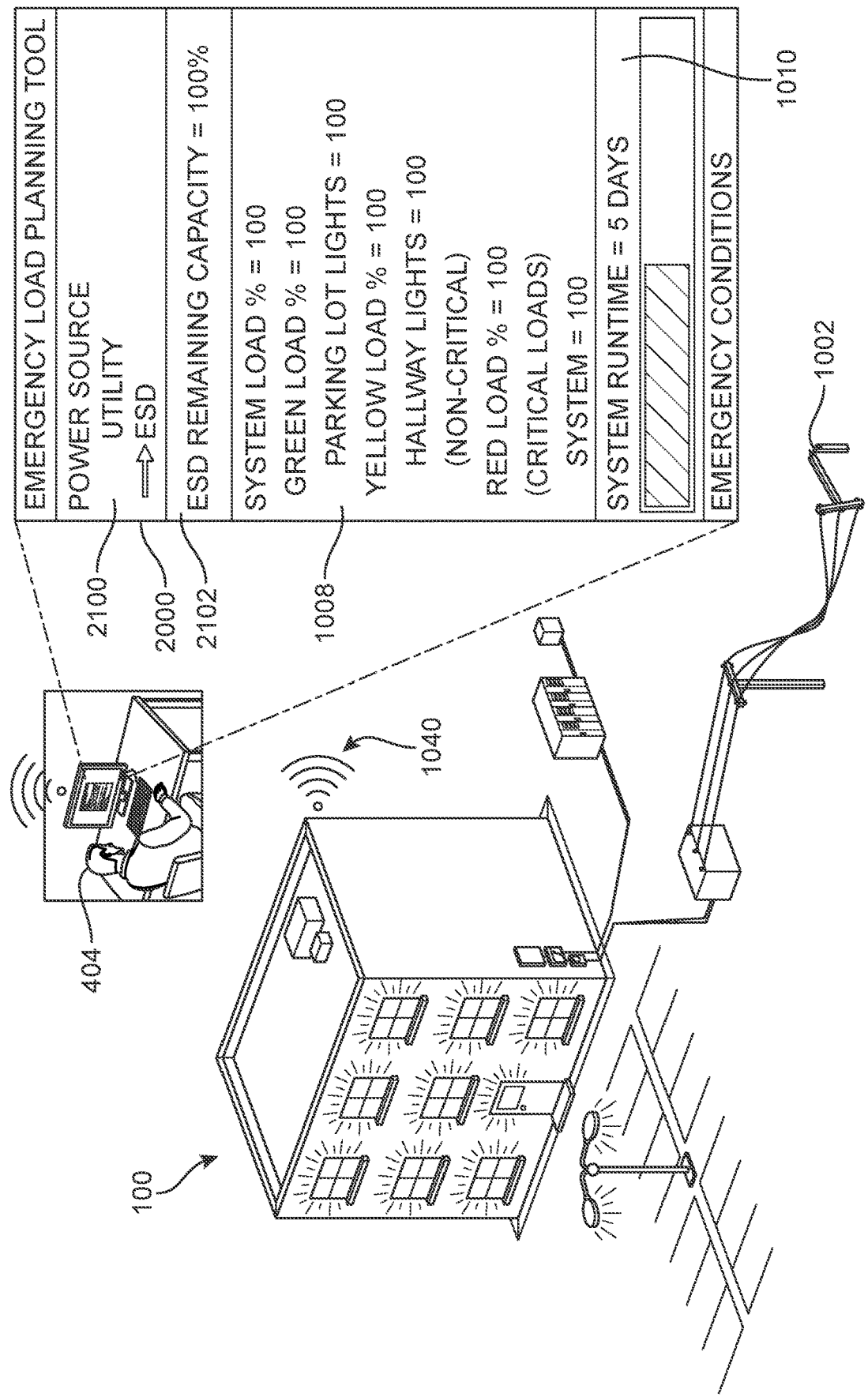
FIG. 21 is a schematic diagram of an embodiment of a facility and a system for controlling power in a facility during a power outage.

FIG. 21 illustrates some of the features described above and shown in earlier FIG. 10 as they relate to the beginning stages of an emergency power outage affecting facility 100, whether from a natural disaster or accidental damage to the grid power supply. In FIG. 21, dashboard 2000 illustrates, at dashboard section 2100, that the energy storage device is supplying power and has a remaining capacity of 100 percent (dashboard section 2102), or 5 days (dashboard section 1010). The remaining features operate with the same effect as described above.

Figure 22:
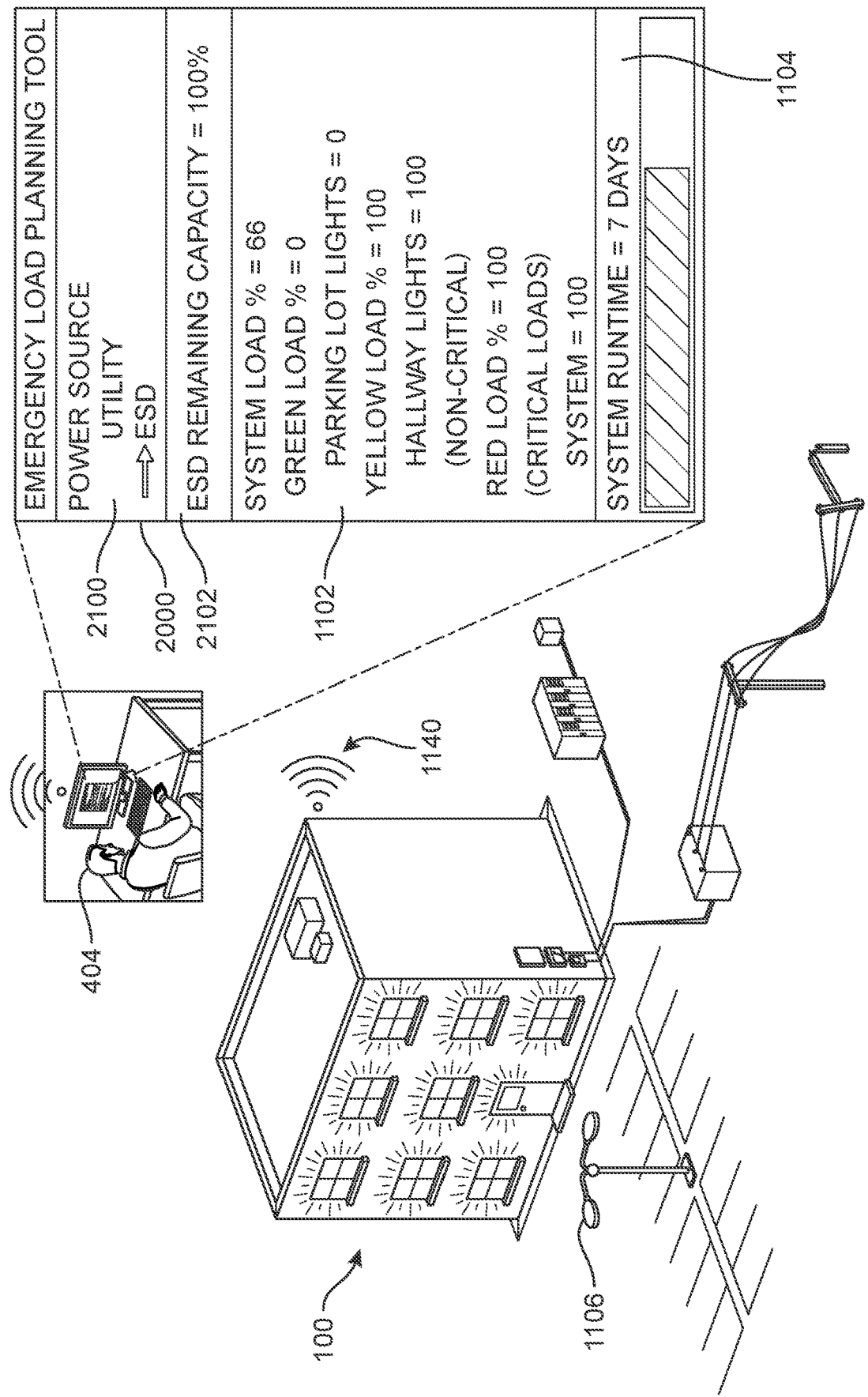
FIG. 22 is a schematic diagram of an embodiment of a facility and a system for controlling power in a facility during a power outage with system load shedding.

FIG. 22 is a continued illustration of FIG. 21 where facility 100 is receiving energy storage device power due to a grid power outage. Many of the features illustrated in FIG. 22 are described above and are illustrated in FIG. 11. FIG. 22 illustrates reduction in green load at step 1102 and resultant expected energy storage device drain down time of 7 days (dashboard section 1104). In the current embodiment, user 404 can use dashboard 2000 to perform electrical system load shedding to extend the system runtime.

Electrical system runtime would be expected to increase if other loads are shed. Referring to FIG. 22, the embodiment of the interface displayed on dashboard 2000 illustrates the same energy storage device power 2102 as shown in FIG. 21, while system load 1102 has decreased due to green load shedding. The embodiment of electrical load planning tool 600 may recalculate system run time due to the system load changes. Typically, system runtime 1104 is expected to increase due to decreased power consumption of the electrical power system.

Figure 23:
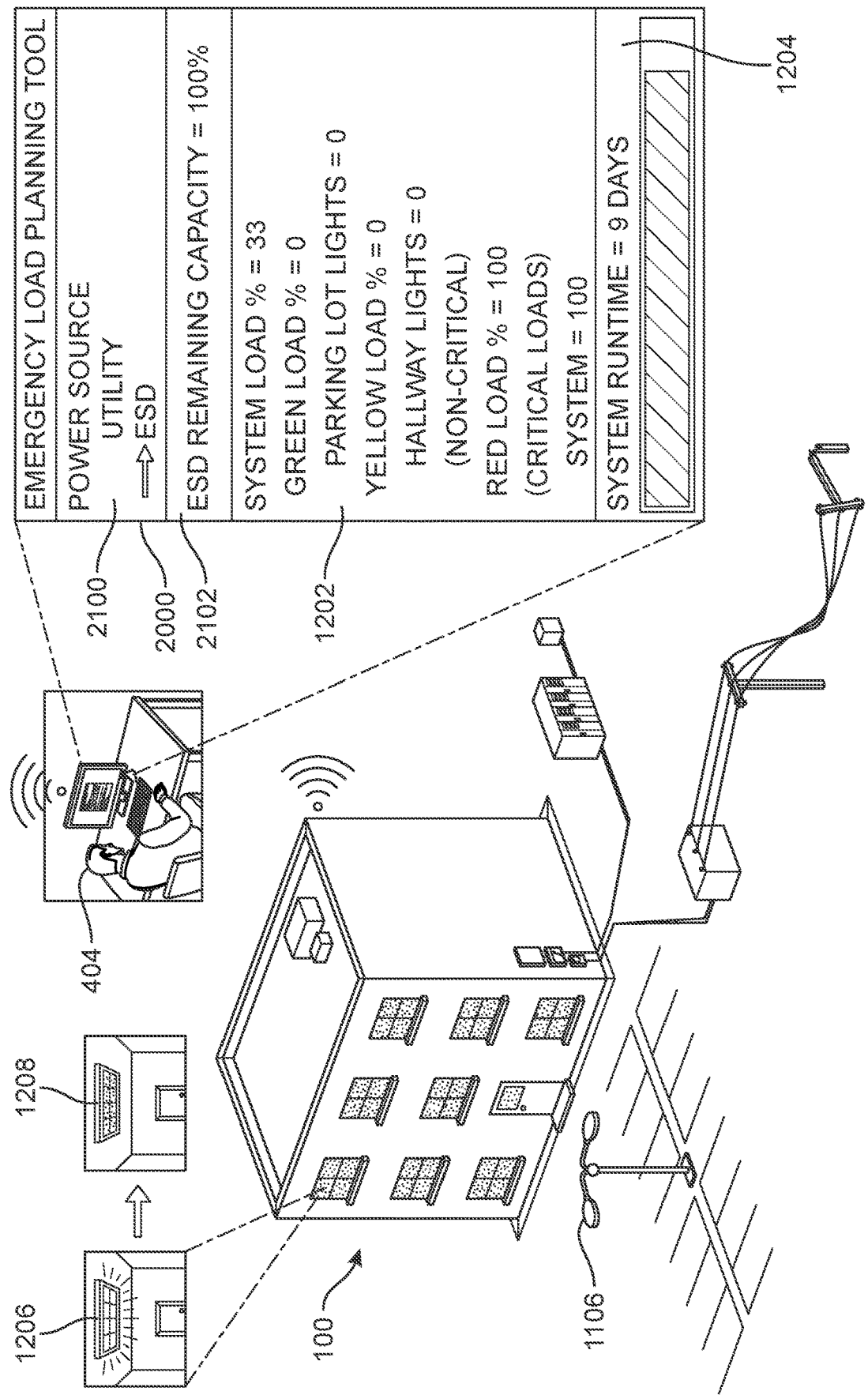
FIG. 23 is a schematic diagram of an embodiment of a facility and a system for controlling power in a facility during a power outage with further system load shedding.

FIG. 23 is a continued illustration of FIG. 21 and FIG. 22 showing facility 100 under a power outage with user 404 operating an interface illustrated in dashboard 2000 to achieve an even longer drain down time. FIG. 23 illustrates some of the features of the embodiment illustrated in FIG. 12. These features have the same effect here as they have in the description above. In this embodiment, facility 100 may receive generator power due to a utility power outage and user 404 can access dashboard 2000 to maximize system runtime. In the current embodiment, green system loads have been shed at dashboard section 1208 by user 404. Typically, green loads are shed first because green loads are non-critical. In some embodiments, user 404 may need to continue increasing system runtime through further system load shedding.

In some embodiments, user 404 may use dashboard 2000 to analyze and access "yellow" system loads. Dashboard 2000 may allow user 404 to turn on, or turn off yellow system loads through communication of system components. In some embodiments, user 404 may partially or completely shed yellow system loads at dashboard section 1202. An example of a yellow load component may include the interior hallway lighting of facility 100. In some embodiments, the interior hallway light may receive power at dashboard section 1206 until user 404 sheds the system load. In some embodiments, user 404 may operate dashboard 900 to shed all yellow loads. In the current embodiment, green and yellow system loads have been shed by user 404 to prolong system runtime for the remaining "red" critical loads of the electrical power system of facility 100. Typically, red critical loads are never turned off unless user 404 allows for system shutdown. Referring to FIG. 23, system runtime has increased dashboard section 1204 in comparison to FIG. 21 and FIG. 22 due to the system load shed of all power loads.

Figure 24:
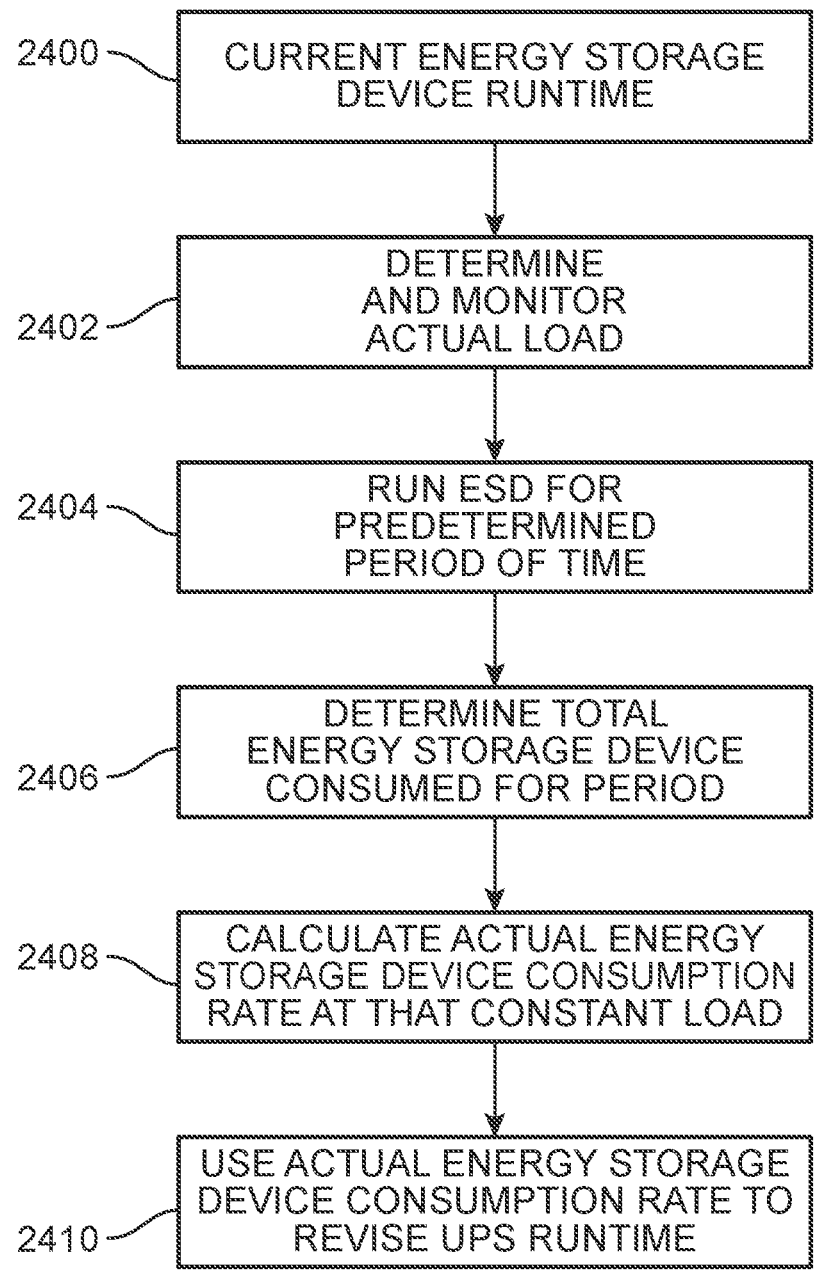
FIG. 24 is a flowchart illustrating a process of an embodiment of a system determining actual energy storage device consumption rate.

FIG. 24 is a flow chart illustrating the process of determining energy consumption rate of energy storage device 1400. In some embodiments, electrical load planning tool 600 may include the option to determine the actual energy consumption rate of energy storage device 1400. Electrical load planning tool 600 may calculate energy consumption of energy storage device 1400 using various components and processes. At step 2400, electrical load planning tool 600 may measure the energy storage device current energy level using communication with energy gauges associated with the energy storage device. In the embodiment, electrical load planning tool 600 may use the meters at the distribution panels to measure, determine, and monitor actual system load at step 2400. Actual load is determined and monitored at step 2402. Electrical load planning tool 600 may measure at step 2404 elements of energy consumption while the energy storage device runs for a predetermined period of time. Electrical load planning tool 600 may use those measured elements of energy consumption at step 2406 to determine the total quantity of energy consumed during the predetermined period of time. Electrical load planning tool 600 may calculate the actual energy consumption rate at the constant load measured at the distribution panel meters at step 2408. Electrical load planning tool 600 may use the actual energy consumption rate at step 2410 to revise system runtime as system loads change during an emergency electrical power outage.

Both Energy Storage Device and Generator Operate

The previous sections relate to circumstances in which the system has an energy storage device and a generator to provide power if grid power is interrupted or degraded. In such embodiments, a facility associated with the energy storage device and generator typically receives power from the energy storage device first when required.

Figure 25:
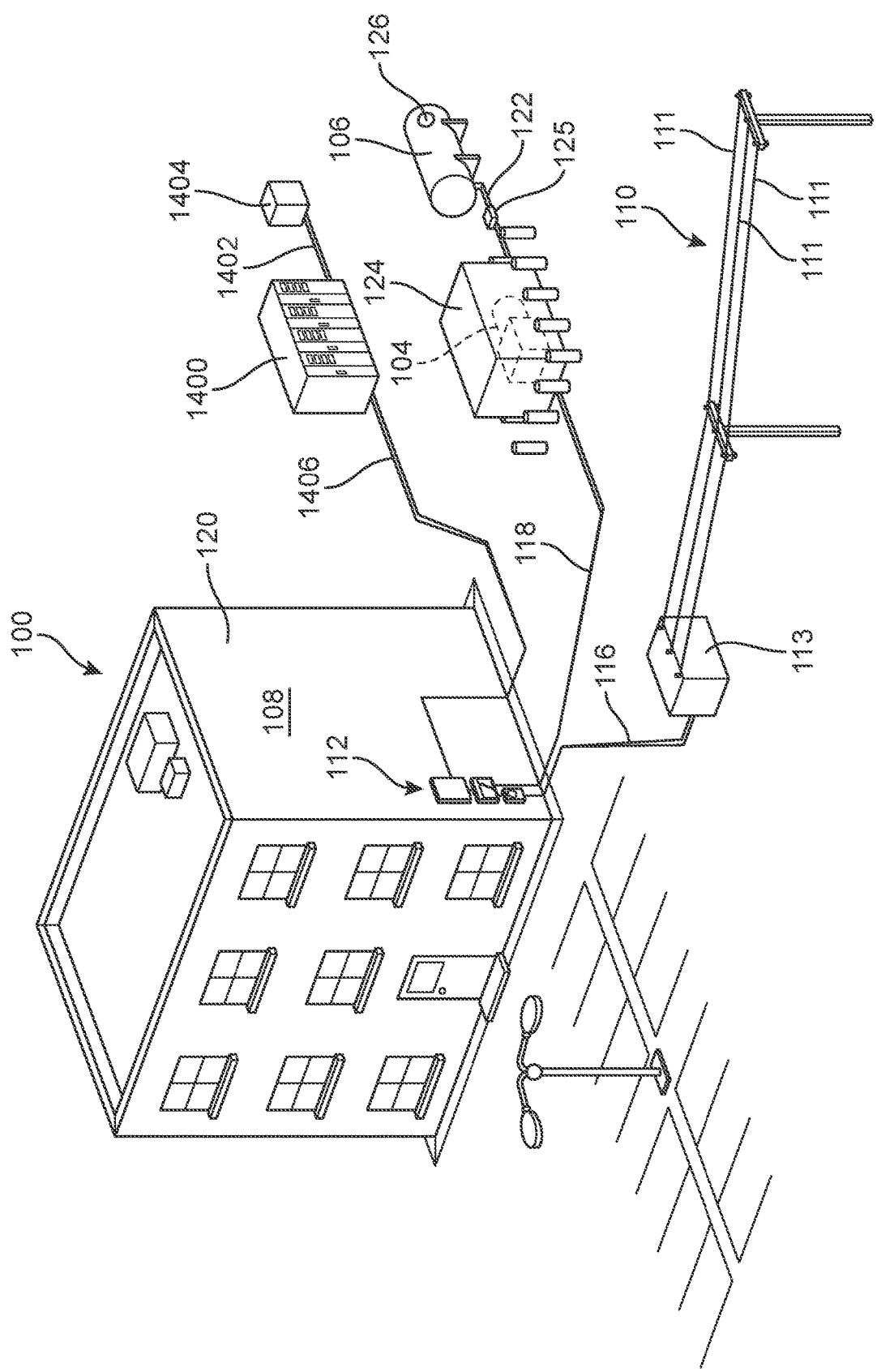
FIG. 25 is a schematic diagram of an embodiment of a facility and associated components of an electrical system.

In an embodiment, FIG. 25 illustrates an exterior view of a facility associated with various power sources and components. FIG. 25 illustrates some of the features of FIG. 1 and FIG. 14. In particular, FIG. 25 illustrates facility 100 having both energy storage device 1400 and generator 104. These and other features found in FIG. 1 and FIG. 14 are described above and have similar functions in these embodiments.

Typically, facility 100 may receive utility power from first wired connection 116 of grid 110 through electrical system component 112. Power may be introduced to building 120 in facility 100 through second wired connection 118. Third wired connection 1406 also introduces power to building 120 in facility 100.

In some embodiments, facility 100 may receive power from a first power source where a second power source or a third power source may not be used unless initial power from the first power source is lost. In embodiments of the disclosure, energy storage device 1400 functions well as a first, emergency energy supply for use until generator 104 can be commissioned. Generators typically do not produce electricity immediately upon start-up. Thus, an energy storage device, such as energy storage device 1400, can be used to keep facility 100 from shutting down until generator 104 starts and is producing power.

In some embodiments, generator 104 may provide power to facility 100. FIG. 25 illustrates an embodiment having fuel tank 106 disposed outside of building 120 and regenerator 1404 located remotely from energy storage device 1400. Regenerator 1404 typically is placed close to the source of power for regeneration, whereas energy storage device 1400 typically will be placed close to the facility 100. In some embodiments, fuel tank 106 may be located remote from generator 104. In the embodiment illustrated in FIG. 25, fuel tank 106 is located in close proximity of generator 104. Referring to FIG. 25, energy storage device 1400, regenerator 1404, generator 104, generator building 124, and fuel tank 106 are located at ground level. In other embodiments, energy storage device 1400, regenerator 1404, generator 104, generator building 124, and fuel tank 106 may be disposed outside building 120 or in any location.

Figure 26:
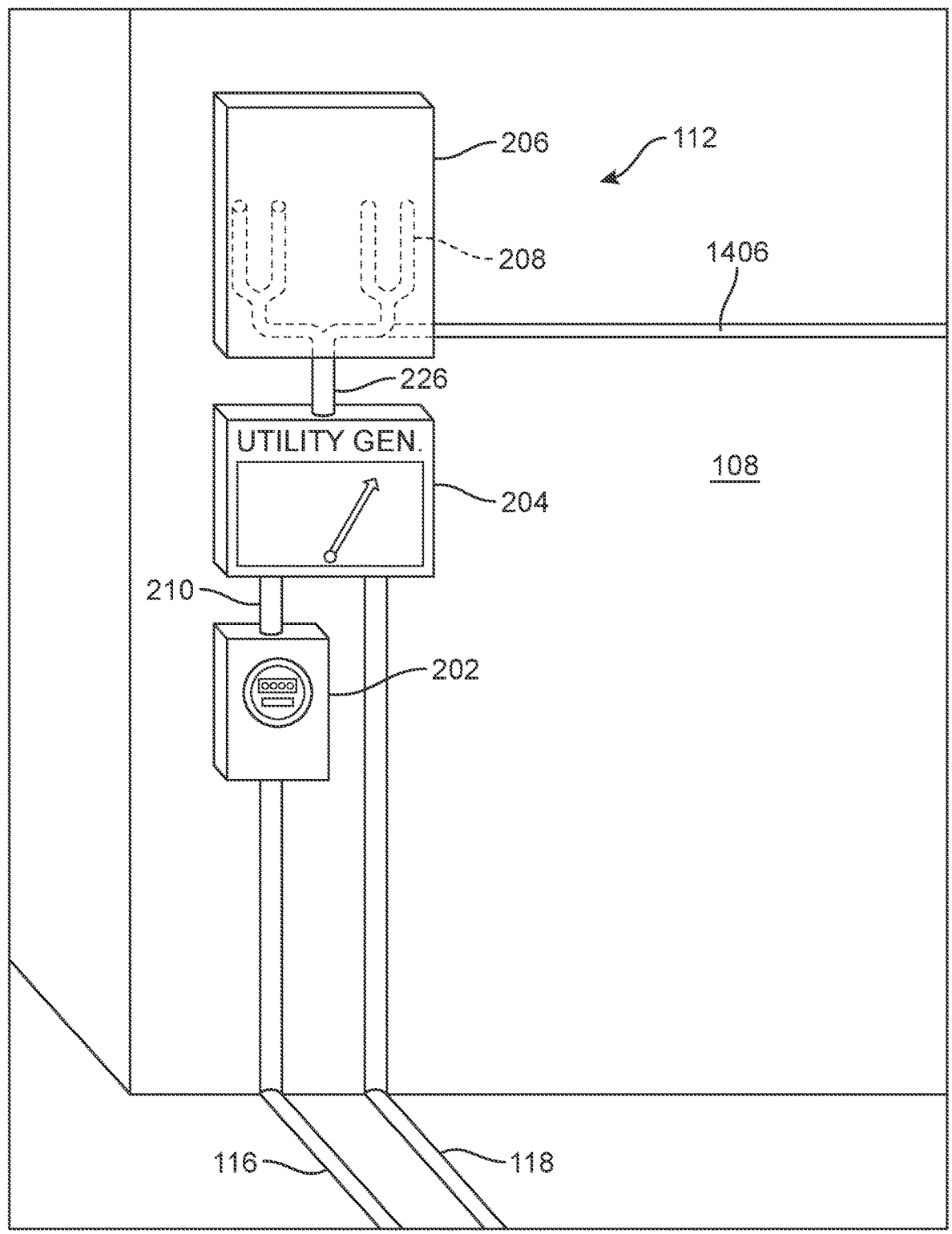
FIG. 26 is a schematic diagram of an embodiment of exterior components of an electrical system associated with a facility.

FIG. 26 illustrates details of an embodiment of electrical unit 112 disposed on wall 108, including many of the features described above and illustrated in FIG. 2 and FIG. 15. First wired connection 116 and second wired connection 118 extending from box 124 and generator 104 can extend and connect with electrical unit 112. In an embodiment, the wired connection 116 from transformer 113 connects to utility power meter 202. Some embodiments may include one or more utility power meters 202.

In embodiments, electrical unit 112 may include an automatic transfer switch (ATS) 204 associated with the electrical system. Automatic transfer switch 204 may receive multiple power leads from multiple power sources such as metered power lead 210 and second wired connection 118. An embodiment of the common connections of electrical unit 112 illustrates wired connector 1406 from energy storage device 1400 providing power directly to wire components 208. Typically, energy storage device 1400 has its own integrated transfer switch that will operate automatically if power ceases to flow from connection 226.

In embodiments having both an energy storage device and a generator, a typical internal electrical distribution system may have components of electrical distribution panel 300 as they are described above and as they relate to FIG. 3.

Figure 27:
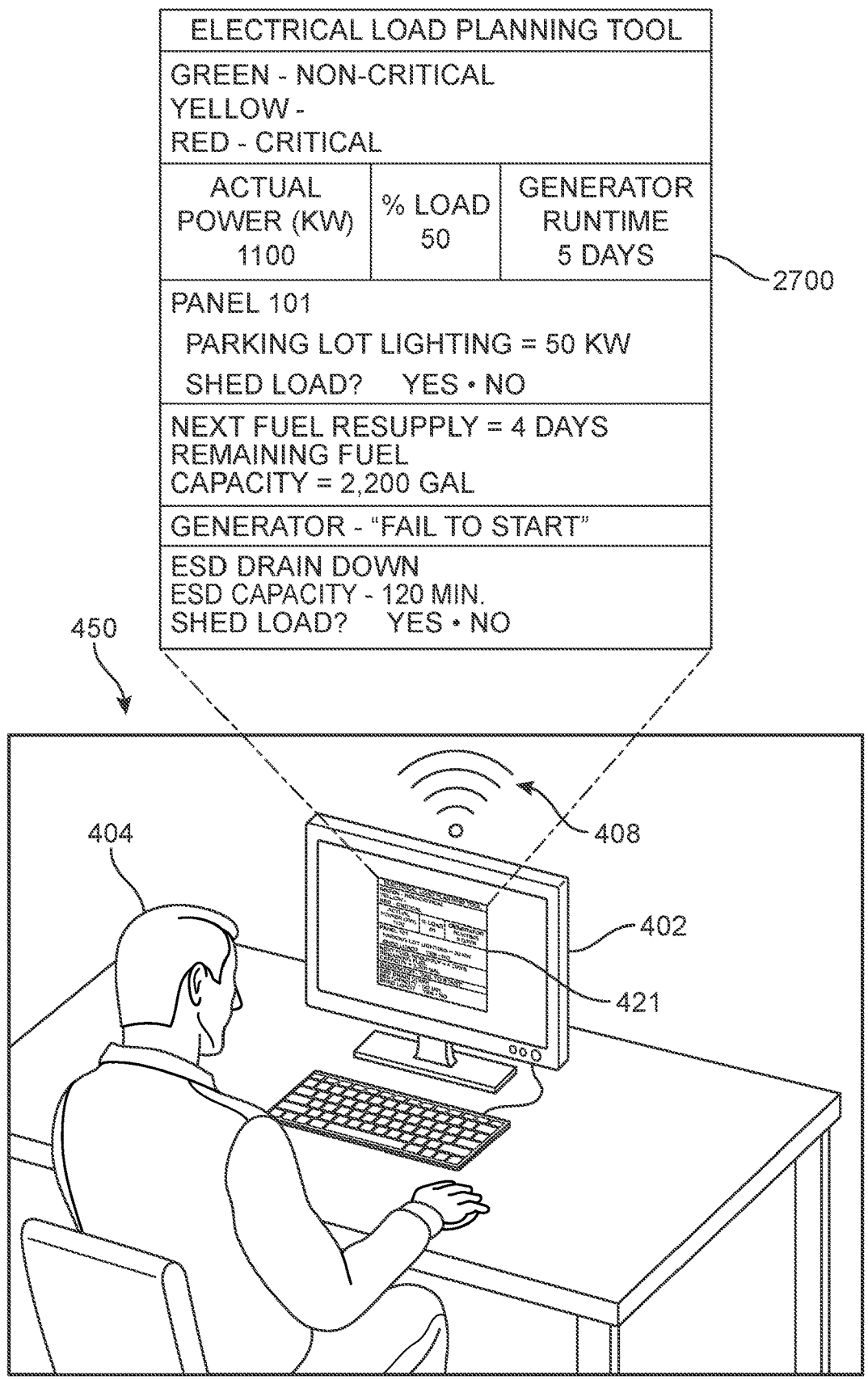
FIG. 27 is a schematic diagram of an embodiment of a user operating a system for controlling power in a facility.

FIG. 27 is a schematic diagram illustrating a user accessing a system 450 for controlling power to a facility. FIG. 27 illustrates some of the features described above and shown in earlier FIG. 4 and FIG. 16. FIG. 27 illustrates dashboard 2700 for embodiments having both an energy storage device and a generator. Thus, dashboard 2700 includes information about generator runtime and fuel remaining and energy storage device drain down. Thus, user 404 may consider all relevant information when deciding how to operate the system.

In embodiments, system loads may include a numerical value corresponding with their name and load consumption. System 450 may display a numerical value representing total system power consumption based on the each system load of the electrical system, may calculate generator runtime based on multiple components, or may calculate energy storage device runtime and generator runtime based on total system load power consumption and predetermined generator fuel consumption, i.e., the condition (expected draintime) of the energy storage device, and predetermined generator fuel consumption. In still other embodiments, user 404 of system 450 may be able to adjust load component values to change the total system load power consumption. In still other embodiments, system 450 may recalculate generator runtime after user 404 makes changes to system load values.

The embodiment of system 450 may allow user 404 to simulate electrical system conditions to maximize energy storage device and generator runtime. In some embodiments, user 404 may use system 450 to determine the necessary energy storage device and generator runtime for the electrical system after simulating shutting off or shedding predetermined system loads. In some embodiments, user 404 can use the information and simulations provided by system 450 to determine which real system loads to shut off. In some embodiments, user 404 can manually shut off real system loads of the electrical system associated with facility 100. In some embodiments, user 404 can shut off real system loads and increase generator run time. In other embodiments, system 450 may provide the appropriate information to user 404 to shut down all power to facility 100 to protect vulnerable components or keep the system running as long as possible.

Figure 28:
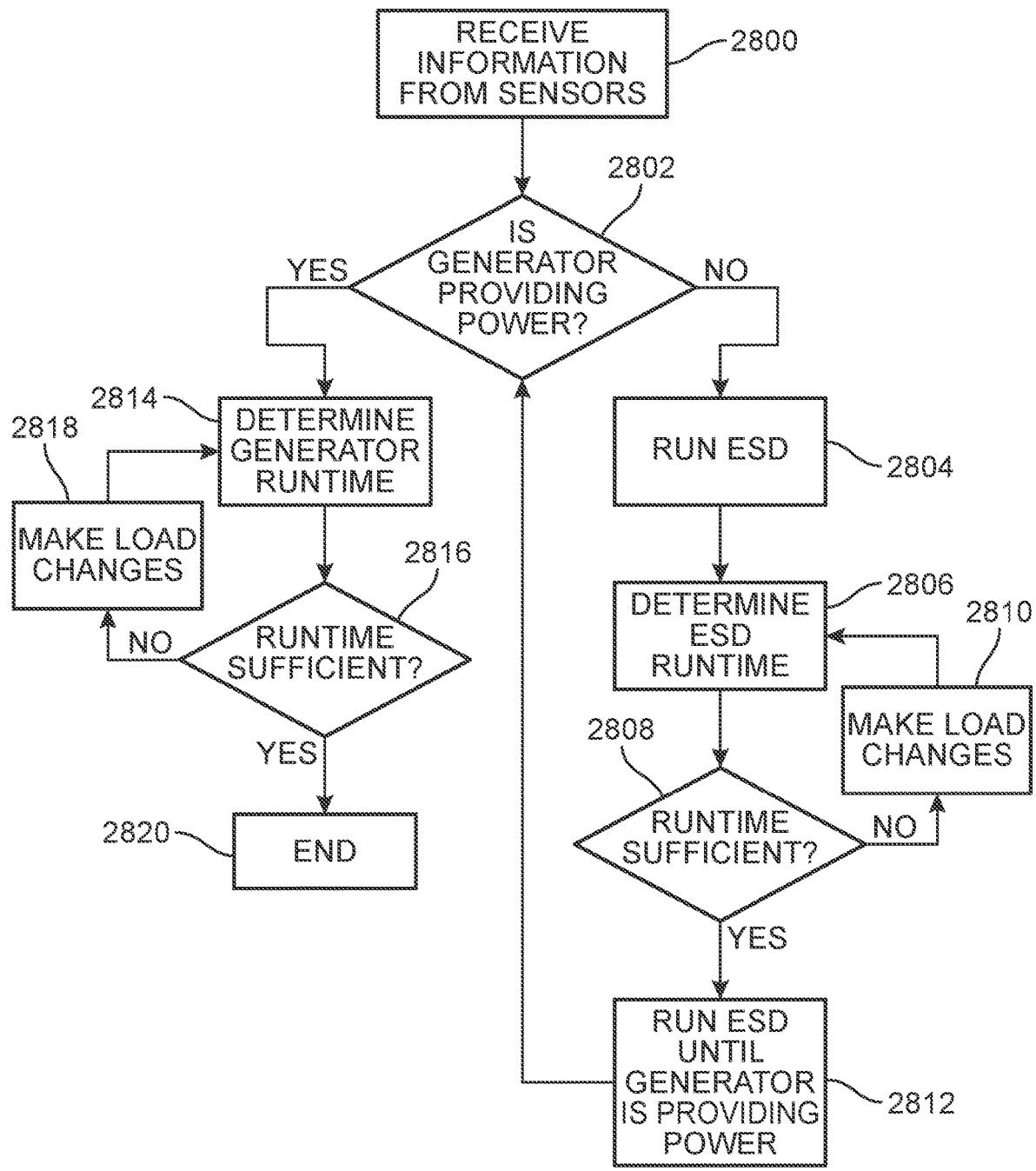
FIG. 28 is a flowchart illustrating a process of an embodiment of a system analyzing data to determine system runtime sufficiency.

FIG. 28 is a flowchart illustrating an embodiment of a process to analyze and utilize data from electrical system sensors to create a sufficient energy storage device and generator run time. As shown in FIG. 28, system 450 may, at step 2800, receive information from system sensors (such as power and breaker meters) that can measure power consumption. After receiving this information, system 450 may determine whether the generator is supplying power at step 2802.

In some embodiments, the generator will not supply power when power is demanded, so system 450 instructs the energy storage device to run at step 2804. Energy storage device runtime will be determined in step 2806, and a decision is made at step 2808. In some embodiments, if energy storage device runtime is expected to be sufficient to provide power to the system until grid power is restored, the energy storage device is instructed at step 2812 to continue running. In some embodiments, the runtime is not expected to be sufficient at step 2808, so user 404 may make load changes at step 2810. After user 404 sheds some load, such as "green" load, and energy storage device runtime is again calculated at step 2806.

In some embodiments, this iteration of energy storage device runtime calculations may be used to accommodate brief distortions and disturbances of grid power, and with the energy storage device providing power, a generator is started after a first predetermined period of time. This period provides time for the grid power to be restored to normalcy. A first predetermined period may be between about 15 seconds and about 120 second, typically between about 20 seconds and about 90 seconds, and more typically between about 30 seconds and about 60 seconds. Then, at the end of a second predetermined period, the generator will be producing electricity and may be substituted for the energy storage device. In embodiments of the disclosure, the second predetermined period is related to the abilities of the particular generator, but may be between about 15 seconds and about 600 second, typically between about 30 seconds and about 360 seconds, and more typically between about 45 seconds and about 240 seconds.

In some embodiments, when the generator is supplying power at step 2802, user 404 may determine generator runtime at step 2814 and may conclude at step 2816 that the system runtime is sufficient or not sufficient depending on the system being able to run until a designated recharge or until utility power is restored. In some embodiments, user 404 may determine at step 2818 that the system runtime is not sufficient, where user 404 may need to shed electrical loads at step 2818 to decrease system power consumption and increase system runtime. System 450 may, at step 2814, recalculate generator runtime based on system load changes and deceased system power consumption. In some embodiments, user 404 may determine at step 506 that the recalculated generator run time is sufficient because the generator can run for the required timeframe. When runtime is sufficient, the calculation ends at step 2820.

Figure 29:
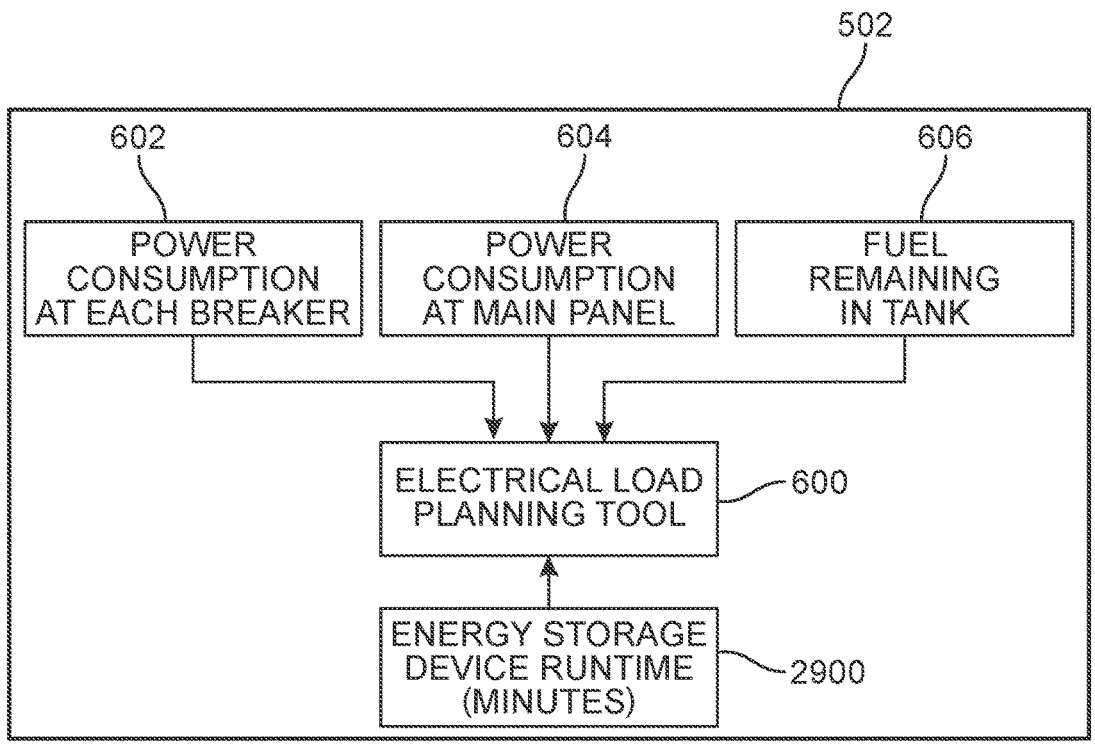
FIG. 29 is a flowchart illustrating a process of an embodiment of a system measuring data from an electrical system.

FIG. 29 illustrates step 502 of an embodiment of FIG. 28 in greater detail. FIG. 29 represents a schematic view of the measurement functions of the system that can control the power of facility 100.

In an embodiment, system 450 may include components to communicate with breaker meter 312. In some embodiments, communication with either main power meter 310 or breaker meter 312 may be from a remote location, or from any area inside facility 100. In some embodiments, electrical load planning tool 600 can measure real time energy remaining in energy storage device 1400 through the use and communication with the energy storage device. In some embodiments, user 404 also can identify energy storage device runtime at step 2900. In some embodiments, user 404 can view the numerical value of the fuel capacity on system 450. In such embodiments, both energy storage device runtime and generator runtime may be determined and used by load planning tool 600. As generator 104 operates and consumes fuel, the dashboard may display a current value for remaining fuel in fuel tank 106. Similarly, energy storage device runtime may be updated and illustrated at step 2900. In some embodiments, if the generator is running, the energy storage device will not be used. Typically, the values displayed on the dashboard stay updated in real time.

Figure 30:
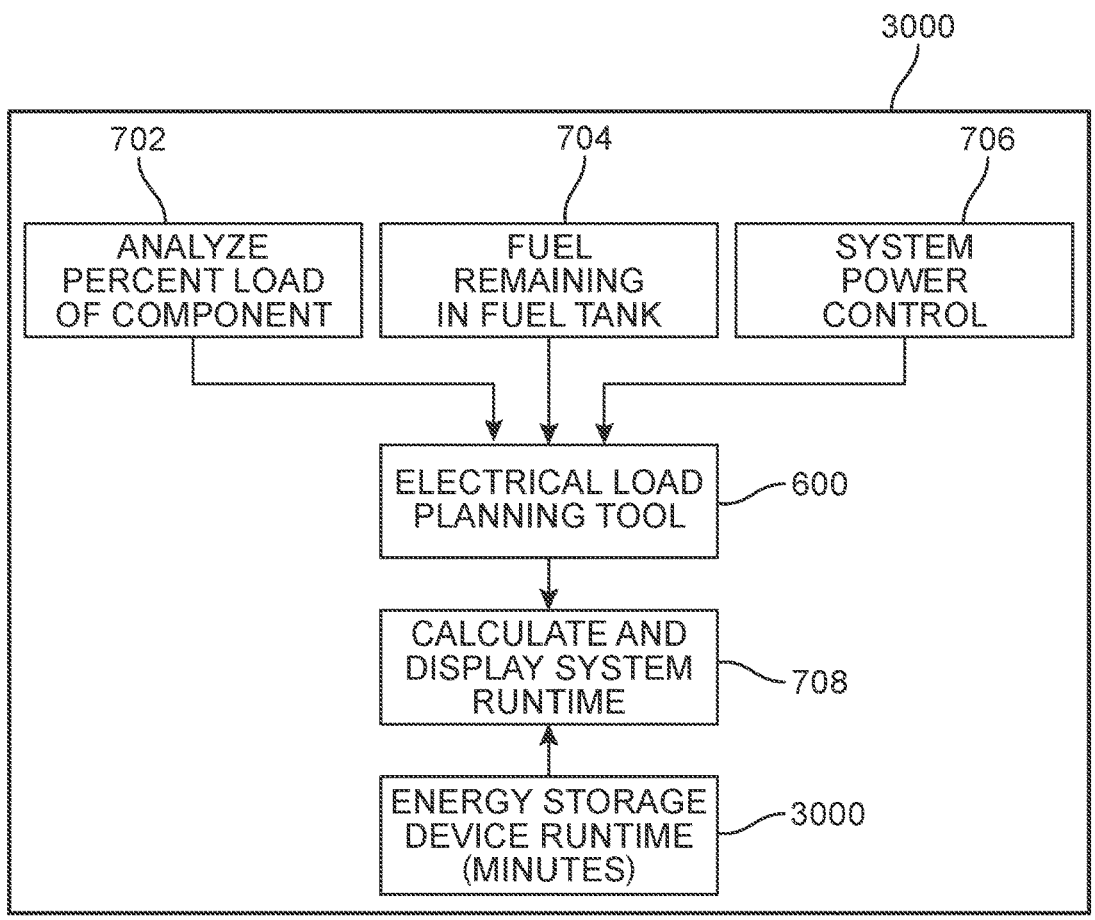
FIG. 30 is a flowchart illustrating a process of an embodiment of a system calculating system runtime.

FIG. 30 illustrates step 3000 for determining system runtime. FIG. 30 is a schematic representation of the various calculations that electrical load planning tool 600 may provide to user 404 on systems 450. In some embodiments, electrical load planning tool 600 can, at step 704, measure the remaining fuel in fuel tank 106 to determine how long the generator can run based on the fuel quantity. Similarly, energy storage device runtime is determined at step 2900 and is assessed in step 708. Electrical load planning tool 600 may include components to allow user 404 to shed electrical loads to maximize system runtime. In some embodiments, user 404 may need to shed electrical loads to lower the total percent load and power consumption of the electrical system, as shown at step 706. In this embodiment, electrical load planning tool 600 can use previous calculations at step 702, step 704, and step 706 to assess and reassess at step 708 how long the system can run while using generator power. After user 404 sheds desired system loads, electrical load planning tool 600 may recalculate system runtime to maximize generator efficiency to ensure that the system can run until a recharge or a fuel resupply, or until utility power is restored.

In embodiments having an energy storage device and a generator, a remote network is system associated with the electrical power system of facility 100. Components of the network system may carry out the functions and purposes described above and as they relate to FIG. 8.

Some embodiments of electrical load planning tool 600 may include components to allow user 404 to remotely control the electrical power system of facility 100.

For ease of description, the remainder of the detailed description describes a system interface that electronically controls components of the electrical system to maximize system runtime under energy storage device power and generator power. The embodiment of the system dashboard may include features to access and operate electrical load planning tool 600. In an embodiment, electrical load planning tool 600 may be operated in various conditions and scenarios such as power outages. Prior to and during an unplanned power outage, user 404 can access the system interface associated with electrical load planning tool 600 through dashboard 2700. The embodiment of the system dashboard may include components to allow user 404 to access system variables such as system power source, energy storage device power remaining, generator fuel capacity, system load percentage, and system run time. In some embodiments, user 404 may use the system dashboard to make an accurate emergency decision associated with the electrical power to facility 100.

Figure 31:
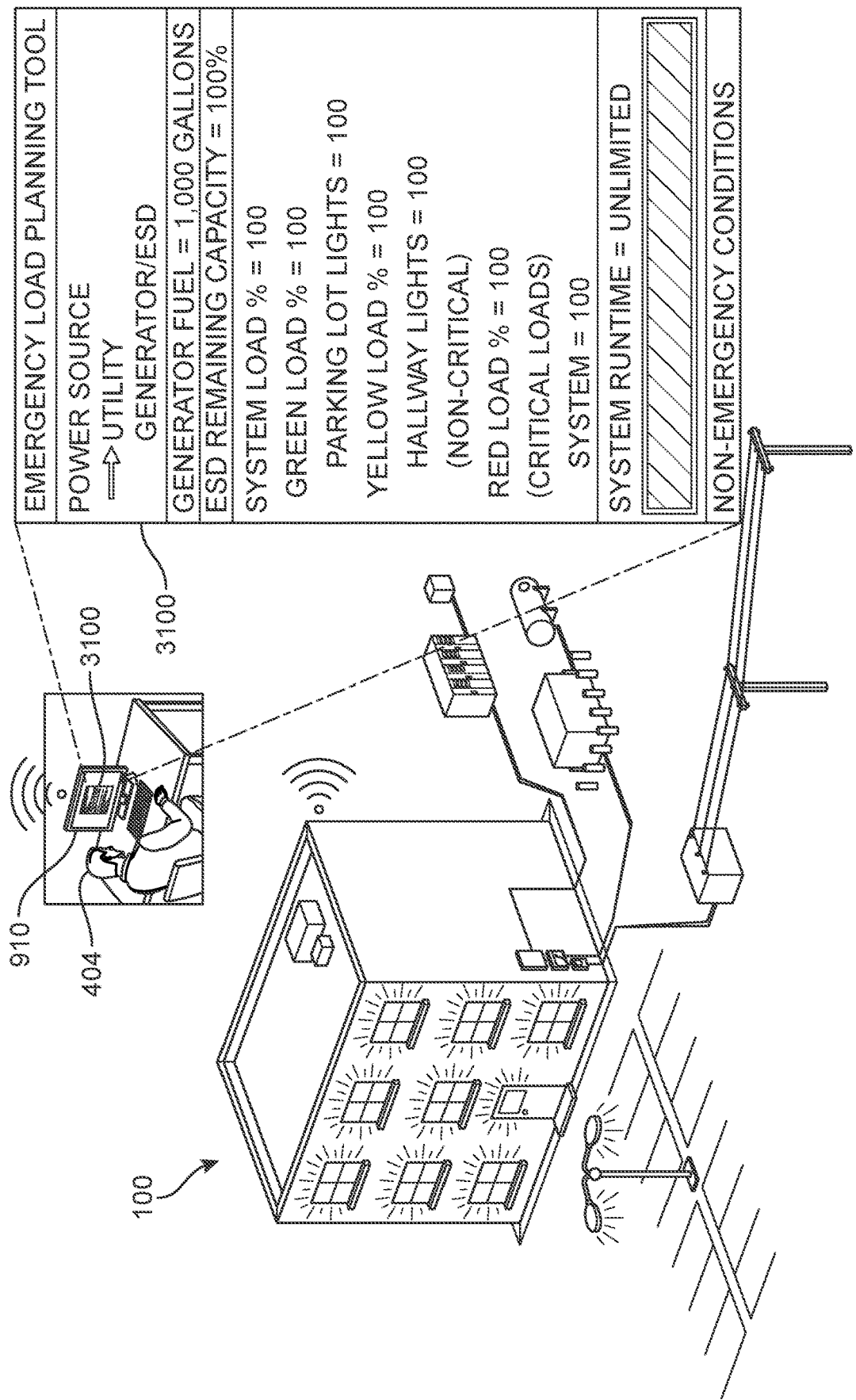
FIG. 31 is a schematic diagram of an embodiment of a facility and a system for controlling power in a facility.

FIG. 31 is an illustration of non-emergency conditions of facility 100 and the view of the system dashboard accessed by user 404. As shown in FIG. 31, facility 100 has electrical power. In the embodiment, both utility and supplemental (energy storage device and generator) power components are not damaged, thus providing grid power to facility 100. In the embodiment, an interface illustrated on dashboard 3100 can be associated with computer 910 that allows user 404 to access and control the interactive components of the electrical system. Referring to FIG. 31, user 404 can assess the components displayed on dashboard 3100. In some embodiments, user 404 may need to utilize dashboard 3100 to analyze emergency system run time. In this embodiment, user 404 may not need to utilize dashboard 3100 since facility 100 is not experiencing a power outage.

Figure 32:
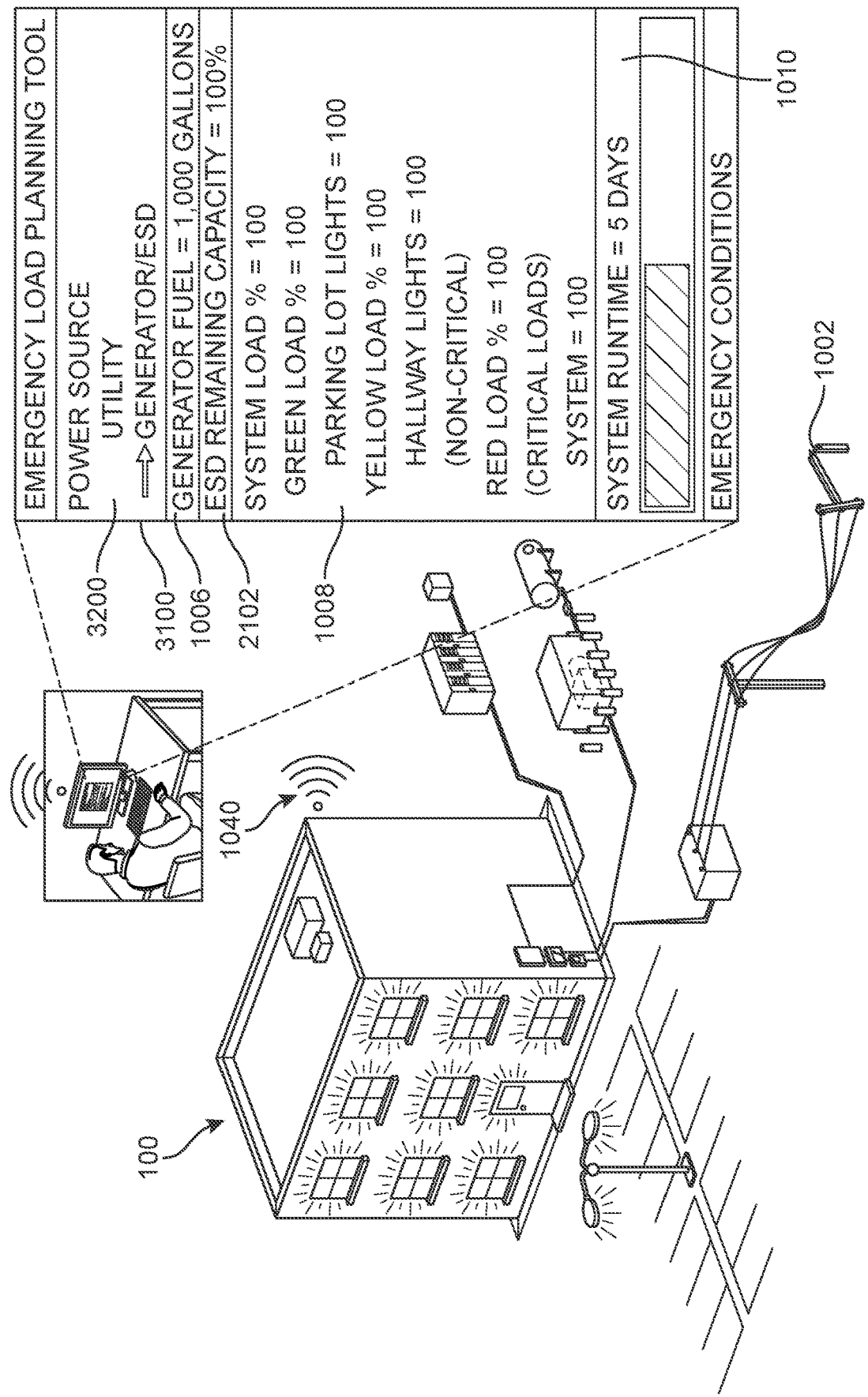
FIG. 32 is a schematic diagram of an embodiment of a facility and a system for controlling power in a facility during a power outage.

FIG. 32 is an illustration of the beginning stages of an emergency power outage affecting facility 100, whether from a natural disaster or accidental damage to the grid power supply. Referring to FIG. 32, utility power components 1002 have been damaged. In some embodiments, energy storage device 1400 (see FIG. 25) and generator 104 (see FIG. 25) in generator building 124 can provide power to facility 100 after activation of automatic transfer switch 204 (see FIG. 26), or an automatic transfer switch in energy storage device 1400. In the event of facility 100 loses utility power and turns to energy storage device power or generator power, the changes in the electrical system data feedback may be viewed and accessed through dashboard 3100. In some embodiments, dashboard 3100 may receive data feedback from multiple system sensors associated with the electrical system (see FIG. 28 and FIG. 29).

An interface, illustrated as dashboard 3100 in FIG. 32, may allow user 404 to access information associated with facility power sources during an emergency power outage. Some embodiments of dashboard 3100 may allow user 404 to electronically view and control the status of automatic transfer switch 204 through system components providing communication 1040 to appropriate devices. The actual configuration of the power source is shown in dashboard section 3200 of dashboard 3100. Also, energy storage device 1400 typically has its own, integrated transfer switch. In FIG. 32, all system component loads display one hundred percent at dashboard section 1008, meaning that facility 100 is receiving power to all electrical components. In the embodiment, an interface may analyze and calculate system runtime. In the current embodiment, based on the energy storage device capacity at dashboard section 2102 and fuel capacity at dashboard section 1006, facility 100 system runtime at dashboard section 1010 may last for five days. In other embodiments, system runtime may be longer or shorter, depending on the different variables that are included in system runtime calculation. In some embodiments, system runtime may need to extend long enough to reach a designated recharge or fuel resupply or the time when utility power is restored.

Figure 33:
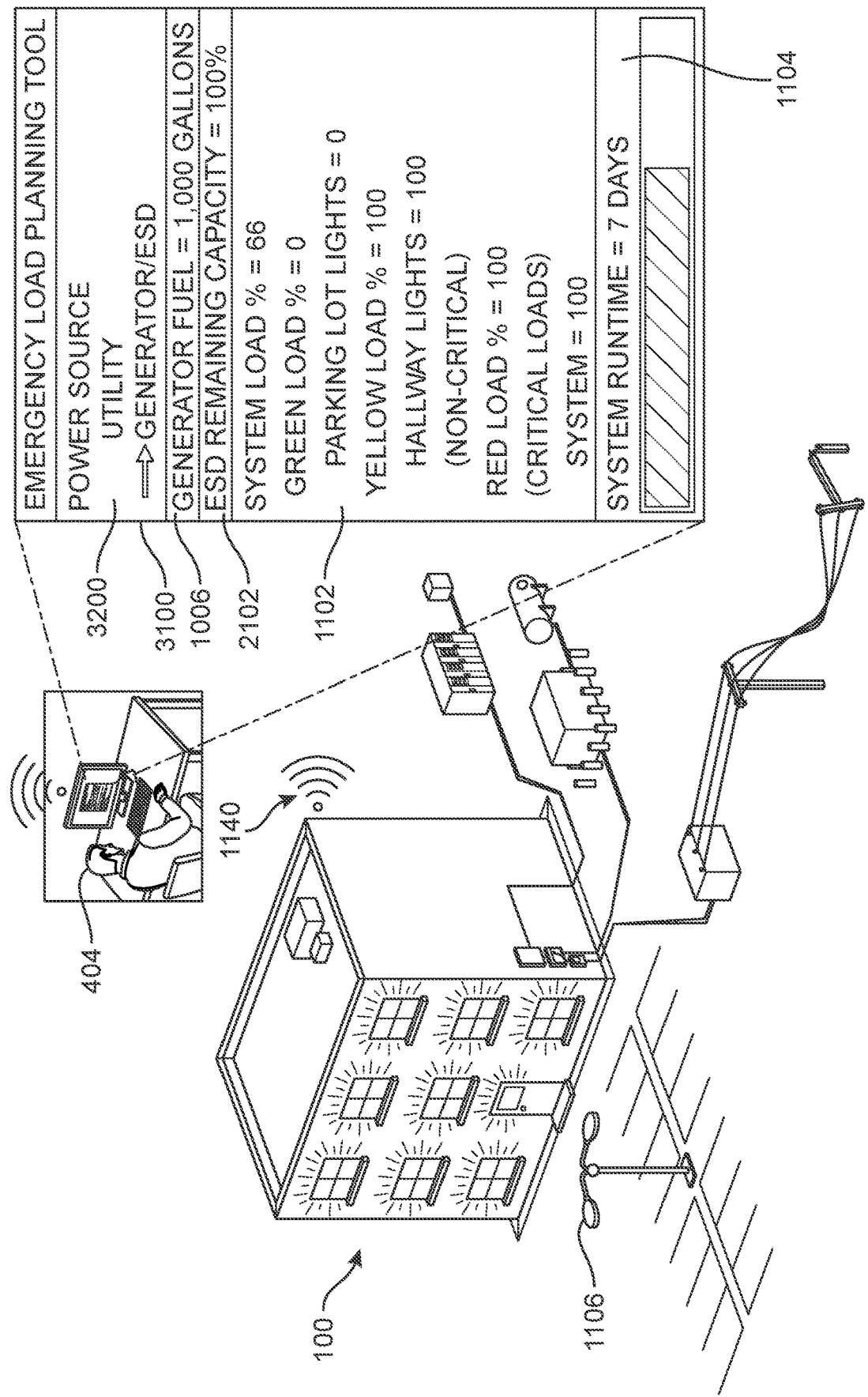
FIG. 33 is a schematic diagram of an embodiment of a facility and a system for controlling power in a facility during a power outage with system load shedding.

FIG. 33 is a continued illustration of FIG. 32 where facility 100 is receiving generator power due to a grid power outage and user 404 can utilize an interface, such as that illustrated as dashboard 3100, to control the electrical power system. In the current embodiment, user 404 can use dashboard 3100 to perform electrical system load shedding to extend the system runtime. In some embodiments, user 404 can shed non-critical loads 1102 to decrease power consumption. An example of a green load may include parking lot lighting 1106 associated with facility 100. In some embodiments, user 404 may shed the total load of a component, meaning the load percentage changes from one hundred percent to zero. In other embodiments, user 404 may partially shed a load where a load may change from one hundred percent to a predetermined load percentage. In an embodiment of a total load shed, green loads such as parking lot lighting 1106 may be completely turned off. In the embodiment of a partial load shed, parking lot lighting 1106 may continue to receive power to predetermined light fixtures.

Electrical system runtime would be expected to increase if other loads are shed. Referring to FIG. 33, which includes features shown in FIG. 1 and FIG. 22, the embodiment of the interface displayed on dashboard 3100 illustrates the same generator fuel amount in dashboard section 1006 as shown in FIG. 32, while system load at dashboard section 1102 has decreased due to green load shedding. The embodiment of electrical load planning tool 600 may recalculate system run time due to the system load changes. Typically, system runtime at dashboard section 1104 is expected to increase due to decreased power consumption of the electrical power system.

Figure 34:
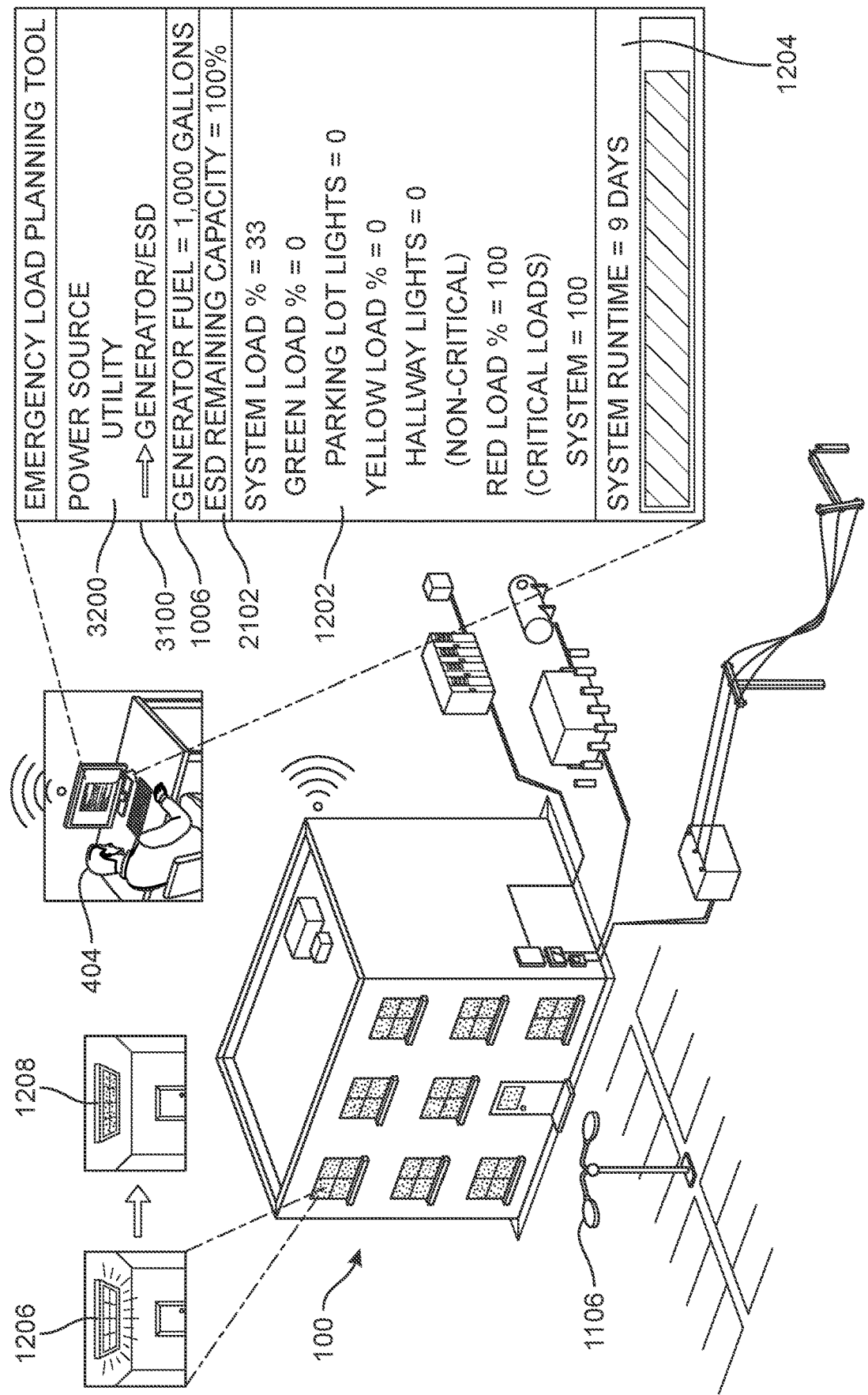
FIG. 34 is a schematic diagram of an embodiment of a facility and a system for controlling power in a facility during a power outage with further system load shedding.

FIG. 34 is a continued illustration of FIG. 32 and FIG. 33 showing facility 100 under a power outage with user 404 operating an interface illustrated in dashboard 3100. In this embodiment, facility 100 may receive energy storage device power or generator power due to a utility power outage and user 404 can access dashboard 3100 to maximize system runtime. In the current embodiment, green system loads have been shed as illustrated at dashboard section 1208 by user 404.

In some embodiments, user 404 may use dashboard 3100 to analyze and access "yellow" system loads. Dashboard 3100 may allow user 404 to turn on, or turn off yellow system loads through communication of system components. In some embodiments, user 404 may partially or completely shed yellow system loads at dashboard section 1202. An example of a yellow load component may include the interior hallway lighting of facility 100. In some embodiments, the interior hallway light may receive power 1206 until user 404 sheds the system load. In some embodiments, user 404 may operate dashboard 3100 to shed all yellow loads. In the current embodiment, green and yellow system loads have been shed by user 404 to prolong system runtime for the remaining "red" critical loads of the electrical power system of facility 100. Typically, red critical loads are never turned off unless user 404 allows for system shutdown. Referring to FIG. 34, system runtime has increased at dashboard section 1204 in comparison to FIG. 32 and FIG. 33 due to the system load shed of all power loads.

The process of determining fuel consumption rate of generator 104 is as described above, as in the technique for determining energy storage device draintime. In some embodiments, electrical load planning tool 600 may include the option to determine the actual fuel consumption rate and draintime. Electrical load planning tool 600 may calculate fuel consumption of generator 104 or draintime of energy storage device 1400 using various components and processes. Electrical load planning tool 600 may measure the generator and fuel tanks current fuel level and energy storage device condition using communication with gauges. In the embodiment, electrical load planning tool 600 may use the meters at the distribution panels to measure, determine, and monitor actual system load. Electrical load planning tool 600 may measure elements of fuel consumption while the generator runs for a predetermined period of time and may measure energy consumption of the energy storage device. Electrical load planning tool 600 may use those measured elements of fuel consumption and energy consumption to determine the total quantity of energy and fuel consumed during the predetermined period of time. Electrical load planning tool 600 may calculate the actual power consumption rate and the fuel consumption rate at the constant load measured at the distribution panel meters. Electrical load planning tool 600 may use the actual power and fuel consumption rate to revise system runtime as system loads change during an emergency electrical power outage.

As described above, in an emergency, the energy storage device will operate while the generator is starting up but not yet producing sufficient power. In such embodiments, and automatic timing protocol may be utilized without taking measurements of energy or fuel used. Rather, in some embodiments, this iteration of energy storage device runtime calculations may be necessary because the generator has not started for any reason. In such embodiments, user 404 may decide to utilize the energy storage device until it is exhausted, and may decide to shed loads to extend runtime for critical uses.

In some embodiments, it may be necessary or appropriate to repeat a method disclosed in the specification and set forth in the claims. A method may be repeated as many times as is necessary until grid power is completely restored. The systems disclosed and claimed may be used to perform multiple cycles or steps of any disclosed method In some embodiments, the energy storage device can be charged with power from the generator. For example, if the generator is able to satisfy the entirety of the demand, or if a green load could be shed for a short period, the power not utilized in the facility may be used to charge the energy storage device.

In embodiments of the disclosure, gauges, sensors, meters, and similar measuring and characterizing devices need not be directly attached to the object with which they are associated. Rather, the measurements may be sent electronically to any convenient location, including directly to an electronic controller or computer.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for controlling power in a facility, the facility having an electrical system comprising a plurality of loads, a generator with a fuel tank, and an energy storage device, the method comprising:
   determining a first remaining quantity of energy stored in the energy storage device;
   determining a first remaining quantity of fuel stored in the fuel tank;
   allowing the energy storage device and the generator to provide power to the plurality of loads connected to the electrical system for a predetermined period of time;
   after the predetermined period of time, determining a second remaining quantity of energy stored in the energy storage device and a second remaining quantity of fuel stored in the fuel tank;
   calculating an actual energy consumption per unit time for the energy storage device;
   determining an actual energy consumption per unit time for the generator; and
   determining an actual runtime of the energy storage device and an actual runtime of the generator based on the respective actual energy consumptions per unit time.

2. The method of claim 1, further comprising shedding at least a part of the power provided to the plurality of loads based on the actual runtime of the energy storage device, the actual runtime of the generator, and a required runtime of the facility.

3. The method of claim 1, wherein the plurality of loads comprises a first load, a second load, and a third load.

4. The method of claim 3, wherein the third load is shed and the method further comprises:
   calculating an updated actual energy consumption per unit time for the energy storage device and an updated actual energy consumption per unit time for the generator; and
   determining an updated actual runtime of the energy storage device and an updated actual runtime of the generator based on the respective updated actual energy consumptions per unit time, an updated remaining quantity of energy, and an updated remaining quantity of fuel.

5. The method of claim 3, wherein the first load is a critical load, the second load is an intermediate load, and the third load is a non-critical load.

6. The method of claim 5, wherein the first load is never shed.

7. The method of claim 1, wherein the plurality of loads are constant.

8. The method of claim 1, wherein only the energy storage device is used to power the plurality of loads and the actual energy consumption per unit time of the generator is zero.

9. A method for controlling power in a facility, the facility having an electrical system comprising a plurality of loads, a generator with a fuel tank, and an energy storage device, the method comprising:
   determining a first remaining quantity of energy stored in the energy storage device;
   determining a first remaining quantity of fuel stored in the fuel tank;
   allowing the energy storage device and the generator to provide power to the plurality of loads connected to the electrical system for a predetermined period of time;
   after the predetermined period of time, determining a second remaining quantity of energy stored in the energy storage device and a second remaining quantity of fuel stored in the fuel tank;
   calculating an energy consumption per unit time for the energy storage device;
   determining a fuel consumption per unit time for the generator; and
   determining a remaining runtime of the energy storage device and a remaining runtime of the generator based on the energy consumption per unit time of the energy storage device and the fuel consumption per unit time of the generator.

10. The method of claim 1, further comprising shedding at least a part of the power provided to the plurality of loads based on the remaining runtime of the energy storage device, the remaining runtime of the generator, and a required runtime of the facility.

11. The method of claim 1, wherein the plurality of loads comprises a first load, a second load, and a third load.

12. The method of claim 3, wherein the third load is shed and the method further comprises:
   calculating an updated energy consumption per unit time for the energy storage device and an updated fuel consumption per unit time for the generator; and
   determining an updated remaining runtime of the energy storage device and an updated remaining runtime of the generator based on the updated energy consumption per unit time of the energy storage device and the updated fuel consumption per unit time of the generator, an updated remaining quantity of energy, and an updated remaining quantity of fuel.

13. The method of claim 3, wherein the first load is a critical load, the second load is an intermediate load, and the third load is a non-critical load.

14. The method of claim 5, wherein the first load is never shed.

15. The method of claim 1, wherein the plurality of loads are constant.

16. The method of claim 1, wherein only the energy storage device is used to power the plurality of loads and the energy consumption per unit time of the generator is zero.

17. A method for controlling power in a facility, the facility having an electrical system comprising a plurality of loads, a generator with a fuel tank, and an energy storage device, the method comprising:
   calculating an energy consumption per unit time for the energy storage device;
   determining a fuel consumption per unit time for the generator;
   determining a remaining runtime of the energy storage device and a remaining runtime of the generator based on the energy consumption per unit time of the energy storage device and the fuel consumption per unit time of the generator; and
   shedding at least a part of the power provided to the plurality of loads based on the remaining runtime of the energy storage device, the remaining runtime of the generator, and a required runtime of the facility.

18. The method of claim 17, wherein the plurality of loads comprises a first load, a second load, and a third load;
   wherein the third load is shed and the method further comprises:
   calculating an updated energy consumption per unit time for the energy storage device and an updated fuel consumption per unit time for the generator; and
   determining an updated remaining runtime of the energy storage device and an updated remaining runtime of the generator based on the updated energy consumption per unit time of the energy storage device and the updated fuel consumption per unit time of the generator, an updated remaining quantity of energy, and an updated remaining quantity of fuel.

19. The method of claim 17, wherein the plurality of loads comprises a first load, a second load, and a third load;
   wherein the first load is a critical load, the second load is an intermediate load, and the third load is a non-critical load.

20. The method of claim 19, wherein the first load is never shed.

\* \* \* \* \*